US009680585B2

(12) United States Patent
Liu et al.

(10) Patent No.: US 9,680,585 B2
(45) Date of Patent: Jun. 13, 2017

(54) CLOCK DATA RECOVERY METHOD AND DEVICE FOR BRANCH SIGNAL IN SDH

(71) Applicant: ZTE CORPORATION, Shenzhen, Guangdong Province (CN)

(72) Inventors: Feng Liu, Shenzhen (CN); Jichao Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 12 days.

(21) Appl. No.: 14/895,212

(22) PCT Filed: Apr. 17, 2014

(86) PCT No.: PCT/CN2014/075586
§ 371 (c)(1),
(2) Date: Dec. 2, 2015

(87) PCT Pub. No.: WO2014/194719
PCT Pub. Date: Dec. 11, 2014

(65) Prior Publication Data
US 2016/0127064 A1    May 5, 2016

(30) Foreign Application Priority Data

Jun. 3, 2013  (CN) .......................... 2013 1 0219909

(51) Int. Cl.
*H04J 3/06* (2006.01)
*H04L 29/08* (2006.01)
(Continued)

(52) U.S. Cl.
CPC ............ *H04J 3/0623* (2013.01); *H04J 3/076* (2013.01); *H04L 5/22* (2013.01); *H04L 7/0016* (2013.01); *H04L 67/2842* (2013.01)

(58) Field of Classification Search
CPC .... H04J 3/06; H04J 3/0623; H04J 3/07; H04J 3/076; H04L 5/22; H04L 7/00; H04L 7/0016; H04L 29/08; H04L 67/2842
See application file for complete search history.

(56) References Cited

U.S. PATENT DOCUMENTS 5,289,507 A    2/1994  Upp
6,240,106 B1 *  5/2001  Slater .................... H04J 3/0685
                                                            370/517
(Continued)

FOREIGN PATENT DOCUMENTS

CN    1183867 A    6/1998
CN    1428945 A    7/2003
(Continued)

*Primary Examiner* — Tri H Phan
(74) *Attorney, Agent, or Firm* — Ling Wu; Stephen Yang; Ling and Yang Intellectual Property

(57) ABSTRACT

Disclosed are a method and a device for recovering clock data of a tributary signal in SDH, wherein the method includes that: it is to extract valid data of the signal from a time slot of each tributary in a synchronous digital hierarchy SDH frame, and store into a storage space corresponding to a time slot of each tributary in a cache; it is to recover a clock signal and a readout signal for the time slot of each tributary by means of time division multiplexing; when the readout signal for the time slot of any tributary is valid, it is to read out contents of the data from the storage space corresponding to the time slot of the tributary in the cache, and latch into a latch corresponding to the time slot; the device includes: a data extracting module, a clock recovery circuit and a data recovery module.

16 Claims, 9 Drawing Sheets

(51) Int. Cl.
  *H04L 5/22*   (2006.01)
  *H04L 7/00*   (2006.01)
  *H04J 3/07*   (2006.01)

(56) References Cited

U.S. PATENT DOCUMENTS

| | | |
|---|---|---|
| 6,463,111 B1 | 10/2002 | Upp |
| 6,982,995 B2 | 1/2006 | Acimovic |
| 7,023,942 B1* | 4/2006 | Roberts ................ H04J 3/0647 370/506 |
| 7,133,648 B1* | 11/2006 | Robinson ............... H04B 10/43 370/252 |
| 7,197,102 B2 | 3/2007 | Rhee et al. |
| 7,822,071 B2* | 10/2010 | DeCusatis ............. H04J 3/0647 370/509 |
| 2003/0169773 A1 | 9/2003 | Gilsdorf |
| 2004/0008066 A1 | 1/2004 | Sasaki et al. |
| 2007/0031148 A1* | 2/2007 | Ll ......................... H04J 3/1611 398/79 |
| 2007/0230966 A1* | 10/2007 | Walsh ................. H04B 10/671 398/155 |
| 2008/0151864 A1* | 6/2008 | Pitzer ................... H04J 3/0658 370/351 |

FOREIGN PATENT DOCUMENTS

| | | |
|---|---|---|
| CN | 1571329 A | 1/2005 |
| WO | 2007016823 A1 | 2/2007 |

\* cited by examiner

CLOCK DATA RECOVERY METHOD AND DEVICE FOR BRANCH SIGNAL IN SDH

TECHNICAL FIELD

The present document relates to the field of communications, and more particularly, to a method and a device for recovering clock data of a tributary signal in synchronous digital hierarchy (SDH).

BACKGROUND OF THE RELATED ART

With the development of the information technology and great demands of people for communication bandwidths, the communication network has changed from the analog network to the digital network, the development of the optic fiber technology has greatly promoted the development of the digital communication technology and met the demands of people for the communication bandwidths. The optical fiber communication which provides low cost, high speed information services, has replaced the conventional copper cable communication rapidly. To adapt to the development of the optical fiber technology, unify products of various communication manufacturers, and achieve the transmission information intercommunication, the International Telecommunication Union has made an SDH communication standard. The frame information structure of the SDH hierarchy has rich overhead bytes, which facilitates information transmission and network management, unified interface parameters can make the equipments of different manufacturers perform networking jointly, which achieves the intercommunication between the communication networks over regions even over the world, thereby these advantages make the transmission networks based on SDH become a dominant direction for building optical communication networks. However new networks are built on the basis of original networks, new SDH networks need to be compatible with previous PDH structure networks, meet the transmission of information from the SDH architecture to the PHD architecture, and achieve that the communication information can be transmitted between different communication network structures. When an SDH network co-exists with a PDH network, a low-speed signal needs to be transmitted through the SDH hierarchy, the simple multiplexing way from the low-speed signal to the high-speed signal in the PDH hierarchy is not applied any more. When signals such as E1, T1, etc., are transmitted in the SDH frame structure, it is necessary to adopt stuffed adjustment bits and fixed stuffing bits, add path overhead bits to the signals, and the signals are multiplexed to the SDH frame structure; similarly when the signals are recovered from SDH frame structure to PDH structure, it is necessary to solve virtual container signals, remove the overhead bits, fixed stuffing bits and adjustment bits, and the E1, T1 signals are recovered. The recovery circuit is a key circuit to achieve the transmission of the signals from the SDH frame structure to the PDH structure, which relates to synchronization information and a jitter index of a clock when the signals pass through different hierarchies. There are 84 T1 tributary signals or 63 E1 tributary signals included in the STM-1 frame structure, because the tributary signals are independent on each other, clocks in different tributaries are different, generally in implementation, recovery is performed separately for each tributary, for example, in china patent CN1638283: Single crystal vibrator digital phase-locked loop device realizing E1 T1 de-jittering. The clock recovery of the single tributary signal is achieved in that patent, but for STM-1 frame, there are 63 E1 tributary signals, when that patent is applied, 63 separate circuit recovery clocks are needed. Compared to the single E1 signal, 63 E1 tributary signals need 63 clock recovery circuits, and 63 times clock resources are consumed. There are 84 T1 tributary signals in STM-1 frame, when that patent is applied, 84 separate recovery circuits are needed. For STM-16, there are 1008 E1 tributary signals, which need to consume 1008 resources, and resource consumption is very large.

SUMMARY

The embodiment of the present document provides a method and a device for recovering clock data of a tributary signal in synchronous digital hierarchy (SDH), which can recover recovery clocks and data of a plurality of tributary signals simultaneously, and greatly save circuit resources.

The embodiment of the present document provides a method for recovering clock data of a tributary signal in synchronous digital hierarchy (SDH), comprising:

extracting valid data of a signal from a time slot of each tributary in a synchronous digital hierarchy (SDH) frame structure, and storing into a storage space corresponding to a time slot of each tributary in caches;

recovering a clock signal and a readout signal for a time slot of each tributary by means of time division multiplexing; and when a readout signal for a time slot of any tributary is valid, reading out contents of data from the storage space corresponding to the time slot of the tributary in the caches, and latching into a latch corresponding to the time slot.

Alternatively, the caches comprise an upstream cache and a downstream cache;

said extracting valid data of a signal from a time slot of each tributary in a synchronous digital hierarchy (SDH) frame structure, and storing into a storage space corresponding to a time slot of each tributary in caches comprises:

extracting valid data of a signal from a time slot of each tributary in the SDH frame structure, and firstly storing the valid data into a storage space corresponding to a time slot of each tributary in the upstream cache; and generating a reading indication signal for a time slot of each tributary by means of time division multiplexing, uniformly reading out contents of data of a time slot of each tributary from the upstream cache according to the reading indication signal, and writing into a storage space corresponding to a time slot of each tributary in the downstream cache.

Alternatively, said generating a reading indication signal for a time slot of each tributary by means of time division multiplexing, uniformly reading out contents of data of a time slot of each tributary from the upstream cache according to the reading indication signal, comprises:

dividing a clock period included in one SDH frame into M time segments, wherein, M is a positive integer, a number of bits of a time slot of each tributary is M−1, M or M+1; generating a reading indication signal for a time slot of each tributary at each time segment by means of time division multiplexing; every time a reading signal is generated, reading out one-bit data of a corresponding time slot:

for a time slot of each tributary of which the number of bits is M, generating a reading indication signal for normal leakage once at each time segment of M time segments, reading out one-bit data;

for a time slot of each tributary of which the number of bits is M−1, generating a reading indication signal for normal leakage once at each time segment of M−1 time segments, reading out one-bit data; and for a time slot of each tributary of which the number of bits is M+1, generating a reading indication signal for a normal leakage once at each time segment of M time segments; generating a reading indication signal for leakage adding once at one of the time segments; and pre-dividing time segments at which a reading indication signal for leakage adding can be generated for a time slot of each tributary in the SDH frame; ensuring that a number of clock periods included in each time segment is always not less than a maximum number of reading indication signals which are probably generated.

Alternatively, said recovering a clock signal for a time slot of each tributary by means of time division multiplexing, comprises:

calculating a cache depth deviation value of a time slot of each tributary circularly by means of time division multiplexing, and accumulating the cache depth deviation values, obtaining an overflow flag of a time slot of each tributary; and a time slot of each tributary recovering the clock signal for the time slot of the tributary independently according to the overflow flag of a time slot of each tributary respectively.

Alternatively, said calculating a cache depth deviation value of a time slot of each tributary circularly by means of time division multiplexing, and accumulating the cache depth deviation values, obtaining an overflow flag of a time slot of each tributary, comprises:

generating a time slot number signal (slot_num) according to a frame head signal and a clock signal, wherein the time slot number signal (slot_num) continuously cycles from 1 to n, n is a positive integer which is determined by a number of time slots in the SDH frame structure; and calculating a cache depth deviation value of a time slot of a current tributary according to a current time slot number signal (slot_num), accumulating the cache depth deviation values, if an accumulation is overflowed, generating an overflow flag of the time slot of the current tributary.

Alternatively, a time slot of each tributary recovering the clock signal for the time slot of the tributary independently according to the overflow flag of a time slot of each tributary respectively, comprises:

setting a counter for a time slot of each tributary, when the counter is cleared to zero, generating a clock pulse;

when an overflow flag of the counter is valid, clearing the counter to zero when a count of the counter reaches a standard value, when an overflow flag of the counter is invalid, clearing the counter to zero when the count of the counter reaches the standard value+1, then the counter restarting to count from zero, wherein, the standard value is determined by a frequency of the clock signal and a nominal frequency of each tributary signal in the SDH frame structure.

Alternatively, said recovering a readout signal for a time slot of each tributary by means of time division multiplexing, comprises:

when the time slot number signal (slot_num) is generated, generating a readout signal for a time slot of each tributary at the same time;

wherein, said a readout signal for a time slot of any tributary being valid comprises that: if a current time slot number signal(slot_num) is within a next cycle period, a counter of a time slot of a current tributary will generate a clock pulse, the readout signal is valid.

The embodiment of the present document further provides a device for recovering clock data of a tributary signal in synchronous digital hierarchy (SDH), comprising:

a data extracting module, configured to extract valid data of a signal from a time slot of each tributary in a synchronous digital hierarchy (SDH) frame structure, and store into a storage space corresponding to a time slot of each tributary in caches;

a clock recovery circuit module, configured to recover a clock signal and a readout signal for a time slot of each tributary by means of time division multiplexing, and send the clock signal and the readout signal to a data recovery module; and the data recovery module, configured to receive the clock signal and the readout signal, and when a readout signal for a time slot of any tributary is valid, read out contents of data from the storage space corresponding to the time slot of the tributary in the caches, and latch into a latch corresponding to the time slot.

Alternatively, the caches comprise an upstream cache and a downstream cache;

the data extracting module comprises:

an upstream data extracting circuit, configured to extract valid data of a signal from a time slot of each tributary in the SDH frame structure, and firstly store the valid data into a storage space corresponding to a time slot of each tributary in the upstream cache; and a bit leakage circuit, configured to generate a reading indication signal for a time slot of each tributary by means of time division multiplexing, uniformly read out contents of data of a time slot of each tributary from the upstream cache according to the reading indication signal, and write the contents of the data into a storage space corresponding to a time slot of each tributary in the downstream cache.

Alternatively, the bit leakage circuit generates a reading indication signal for a time slot of each tributary by means of time division multiplexing, uniformly reads out contents of data of a time slot of each tributary from the upstream cache according to the reading indication signal in the following way:

dividing a clock period included in one SDH frame into M time segments, wherein, M is a positive integer, a number of bits of a time slot of each tributary is M−1, M or M+1; generating a reading indication signal for a time slot of each tributary at each time segment by means of time division multiplexing; every time a reading signal is generated, reading out one-bit data of a corresponding time slot;

for a time slot of each tributary of which the number of bits is M, generating a reading indication signal for normal leakage once at each time segment of M time segments, reading out one-bit data;

for a time slot of each tributary of which the number of bits is M−1, generating a reading indication signal for normal leakage once at each time segment of M−1 time segments, reading out one-bit data; and for a time slot of each tributary of which the number of bits is M+1, generating a reading indication signal for normal leakage once at each time segment of M time segments; generating a reading indication signal for leakage adding at one of the time segments; and pre-dividing time segments at which a reading indication signal for leakage adding can be generated for a time slot of each tributary in the SDH frame; ensuring that a number of clock periods included in each time segment is always not less than a maximum number of reading indication signals which are probably generated.

Alternatively, the bit leakage circuit further comprises:

one or more clock counters, wherein the counter is configured to take a frame head signal as a reference to count;

a time slot allocator, configured to determine leakage positions for normal leakage, leakage adding or leakage decreasing in each time segment and a current leakage time slot number according to an output result of the clock counter; and a reading and writing controller, configured to, according to leakage positions for normal leakage, leakage adding or leakage decreasing in each segment and a current leakage time slot number, at each segment, normally leak data once or add data leakage once or decrease data leakage once from the storage space corresponding to a time slot number in the upstream cache to the storage space corresponding to a time slot number in the downstream cache according to the current leakage time slot number, wherein, a reading indication signal is generated upon the normal leakage, a reading indication signal for the normal leakage is deducted upon decreasing the leakage; a reading indication signal is added at the leakage position for the leakage adding upon adding the leakage.

Alternatively, the bit leakage circuit further comprises:

a leakage controller, configured to generate a leakage adding signal and a leakage decreasing signal according to a cache depth of a storage space in the upstream cache corresponding to a time slot number, wherein, the leakage adding signal represents adding leakage once; the leakage decreasing signal represents decreasing leakage once; and a reading and writing controller, configured to, according to leakage positions for normal leakage, leakage adding or leakage decreasing in each segment and a current leakage time slot number, a leakage adding signal, a leakage decreasing signal, at each segment, add data leakage once according to the leakage adding signal or decrease data leakage once according to the leakage decreasing signal from the storage space corresponding to the time slot number in the upstream cache to the storage space corresponding to the time slot number in the downstream cache according to the current leakage time slot number, wherein, a reading indication signal for the normal leakage is deducted upon decreasing the leakage; a reading indication signal is added at the leakage position for the leakage adding upon adding the leakage.

Alternatively, the clock recovery circuit comprises: a deviation value calculation unit and a counter set for a time slot of each tributary, wherein, the counter comprises an overflow flag;

the deviation value calculation unit is configured to calculate a cache depth deviation value of a time slot of each tributary circularly by means of time division multiplexing, accumulate the cache depth deviation values, obtain an overflow flag of a time slot of each tributary; and the counter of a time slot of each tributary is configured to recover a clock signal for the time slot of the tributary according to the overflow flag.

Alternatively, the clock recovery circuit further comprises:

an accumulation value storage unit, configured to store an accumulation value of last time output by the deviation value calculation unit of a time slot of each tributary into a storage space corresponding to a time slot of each tributary;

a time slot generator, configured to generate a time slot number signal (slot_num) according to a frame head signal and a clock signal, wherein the time slot number signal (slot_num) continuously cycles from 1 to n, n is a positive integer which is determined by a number of time slots in the SDH frame structure;

wherein, the deviation value calculation unit calculates a cache depth deviation value of a time slot of each tributary circularly by means of time division multiplexing, accumulates the cache depth deviation values, obtains an overflow flag of a time slot of each tributary in the following way:

the deviation value calculation unit obtaining a data cache depth of a storage space corresponding to a current time slot number and a count result of a counter corresponding to the current time slot number from the downstream cache according to a current time slot number signal (slot_num), performing an operation to obtain a cache depth deviation value of the time slot of the tributary;

obtaining an accumulation value of last time from a storage space corresponding to a current time slot number of the accumulation value storage unit according to a current time slot number signal (slot_num), accumulating the cache depth deviation value of the time slot of the tributary with the accumulation value of last time, obtaining an accumulation result of the time slot of the tributary; and judging whether an accumulation of this time is overflowed according to the accumulation result, if the accumulation is overflowed, marking an overflow flag on a counter corresponding to a current time slot number, meanwhile storing a remainder of the accumulation result of this time into a storage space corresponding to a current time slot number of the accumulation value storage unit as an accumulation value for a next operation.

Alternatively, a counter of a time slot of each tributary recovers the clock signal for the time slot of the tributary according to the overflow flag in the following way:

the counter of the time slot of each tributary respectively taking a frame head signal as a reference, and performing plus-1-counting from zero according to the clock signal;

when an overflow flag of the counter is valid, clearing the counter to zero when a count of the counter reaches a standard value, when an overflow flag of the counter is invalid, clearing the counter to zero when the count of the counter reaches the standard value+1, then the counter restarting to count from zero, when the counter is cleared to zero, clearing the overflow flag at the same time, wherein, the standard value is determined by a frequency of the clock signal and a nominal frequency of each tributary signal in the SDH frame structure; and when the counter is cleared to zero, generating a clock pulse.

Alternatively, the clock recovery circuit further comprises:

a readout signal generator, configured to, when the time slot number signal (slot_num) is generated, generating a readout signal for a time slot of each tributary at the same time;

wherein, the data recovery module further comprises a latch set for a time slot of each tributary, configured to save contents of data in the storage space corresponding to a time slot number read from the downstream cache; wherein, the latch is numbered according to a time slot number; and when a readout signal for a time slot of any tributary is valid, the data recovery module reads out contents of data from the storage space corresponding to the time slot of the tributary in the caches, and latches into a latch corresponding to the time slot in the following way:

when a readout signal for the time slot of any tributary is valid, reading out contents of data in a storage space corresponding to the time slot number from the downstream cache according to a current time slot number signal(slot_num) and a readout signal, and latching into a latch corresponding to the time slot number; wherein, said a readout signal in a time slot of any tributary being valid comprises that: if a current time slot number signal(slot_num) is within a next cycle period, a counter of a time slot of a current tributary will generate a clock pulse, the readout signal is valid.

Compared with the related art, the method and device for recovering clock data of a tributary signal in SDH provided by the embodiment of the present document adopt one clock recovery circuit for multiple E1 or T1 tributary signals, and can recover recovery clocks and data of a plurality of tributary signals simultaneously by means of time division multiplexing, and circuit resources are greatly saved.

PREFERRED EMBODIMENTS OF THE INVENTION

The embodiments of the present document will be described in detail in combination with the accompanying drawings below. It should be illustrated that without a conflict, the embodiments in the present application and the features in the embodiments can be combined with each other randomly.

Embodiment

Figures 1, 2:
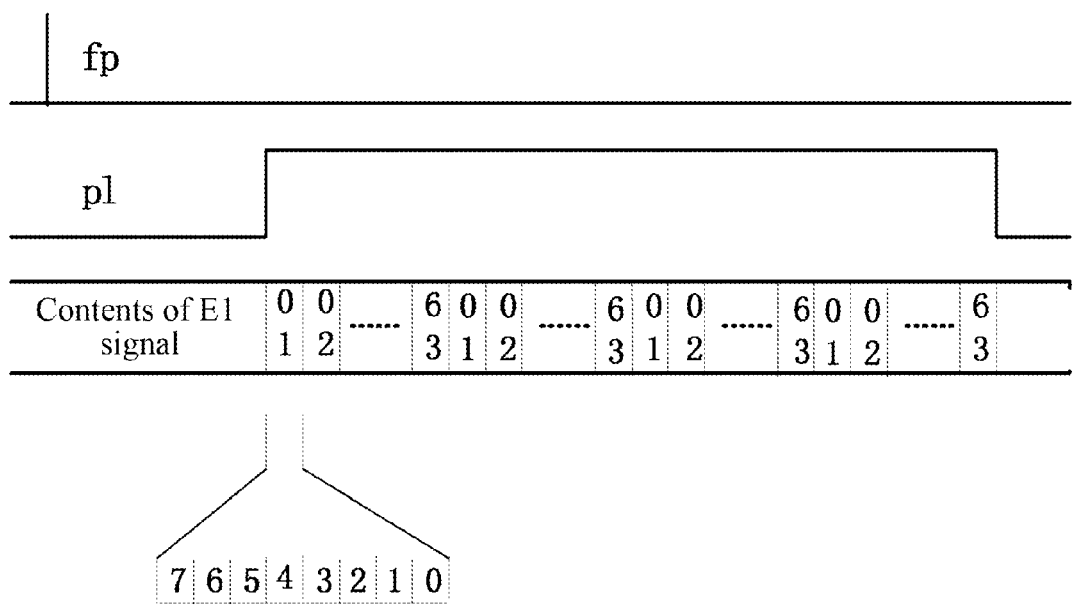
FIG. 1 is a schematic diagram of a corresponding SDH frame structure of the STM-1 level which takes the E1 signal as an example.
FIG. 2 is a signal diagram of receiving a serial signal of the STM-1 frame which takes the E1 signal as an example.

A corresponding frame structure of STM-1 level of the synchronous digital hierarchy (SDH) adopts a byte frame structure of 9 rows*270 columns, and time slots constitute the frame structure by means of byte-interleaving, FIG. 1 gives a schematic diagram of the SDH frame structure which takes E1 signals as an example. In one frame, the first nine columns of the frame structure are section overhead (SOH) bytes and pointer bytes, wherein the $1^{st}$-$3^{rd}$ rows are regenerator section overhead (RSOH), the $5^{th}$-$9^{th}$ rows are multiplex section overhead (MSOH), the fourth row is the pointer bytes, remaining information bytes are in information payload area. 63 E1 tributary signals can be born in an STM-1 frame, E1 signal of each tributary occupies positions of 4 columns in the STM-1 frame, and 63 E1 tributary signals occupy total 63*4=252 columns, 63 E1 tributary signals are aligned respectively by means of interleaving by order of 1-63, 1-63, 1-63, 1-63. In the STM-1 frame, 84 T1 tributary signals can be born, T1 signal of each tributary occupies positions of 3 columns in the STM-1 frame, and 84 T1 tributary signals occupy total 84*3=252 columns, 84 T1 tributary signals are aligned respectively by means of interleaving by order of 1-84, 1-84, 1-84, 1-84.

The STM-1 frame signal is transferred in the optical fiber in serial bit streams, a clock frequency of the STM-1 serial signal is 155.52M. When received, it is to receive in serial bit streams, the STM-1 frame head signal is found in the received bit stream, and the positions of all E1 signals or T1 signals in the STM-1 frame are located according to the AU pointer and TU pointer in a processing frame. Taking the E1 signal as an example, FIG. 2 gives a signal diagram of receiving the E1 signal, wherein the fp signal gives a position of STM-1 frame head, PL indicates positions of all E1 signals in the frame, data give contents of all E1 signals. All E1 signals are received and processed by order of 1-63, for each E1 signal, after 8 bits (1 byte) are received continuously, it is just to start to receive a next E1 signal.

Figure 3:
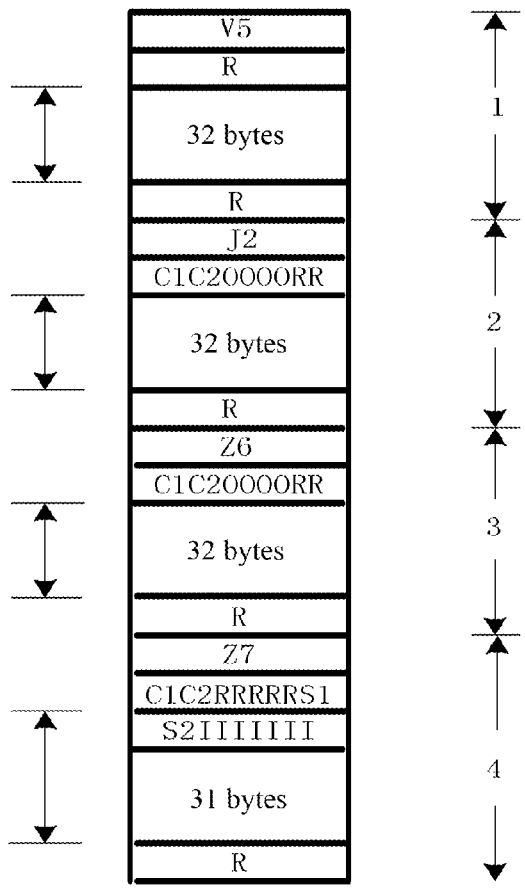
FIG. 3 is a schematic diagram of VC12 multiframe structure of the STM-1 frame.

In the STM-1 frame, the E1 signal is put in VC12 firstly, VC12 is put in TU12, and TU12 is finally put in the SDH frame to be transmitted. In the SDH frame, each TU12 occupies positions of 4 columns, each TU12 signal in one STM-1 frame has 36 bytes, one of the 36 bytes is a pointer byte of TU12 (V1 or V2, V3, V4), and the remaining 35 bytes are contents of VC12, as shown in FIG. 3. For VC 12, each VC 12 has 35 bytes, those 35 bytes constitute one sub-frame, and each 4 sub-frames constitute one multiframe. In VC 12 multiframe, there are 4 overhead bytes V5, J2, Z6, Z7, a fixed stuffing byte or stuffing bit R as well, and a communication bit O. In the VC 12 multiframe, there also are control bits C1, C2 and adjustment bits S1, S2, and the remaining are data bytes or data bits. Whether the S1 bits bear useful data or useless data is decided by the contents of 3 C1s. When C1 is 0, it represents that S1 bears useful data; when C1 is 1, it represents that S1 bears useless data. 3 C1s adopt a majority judgment rule, i.e., when at least two C1s are 0, it is considered that 3 C1s are 0; when at least two C1s are 1, it is considered that 3 C1s are 1. Similarly, the same way is adopted for C2. The structure of each VC12 is exactly the same, the purpose of the embodiment of the present document is to extract the data bits of all E1 signals or T1 signals and recover the clock signals of these E1 signals or T1 signals, which reduces jitters of the clock signals to satisfy the requirement of the standard. In the SDH frame structure, the processing process of the T1 signal is same with that of the E1 signal, although the E1 signal is taken as the example to illustrate in the embodiment, but the device and method in the embodiment are also applied for the T1 signal.

Figure 4:
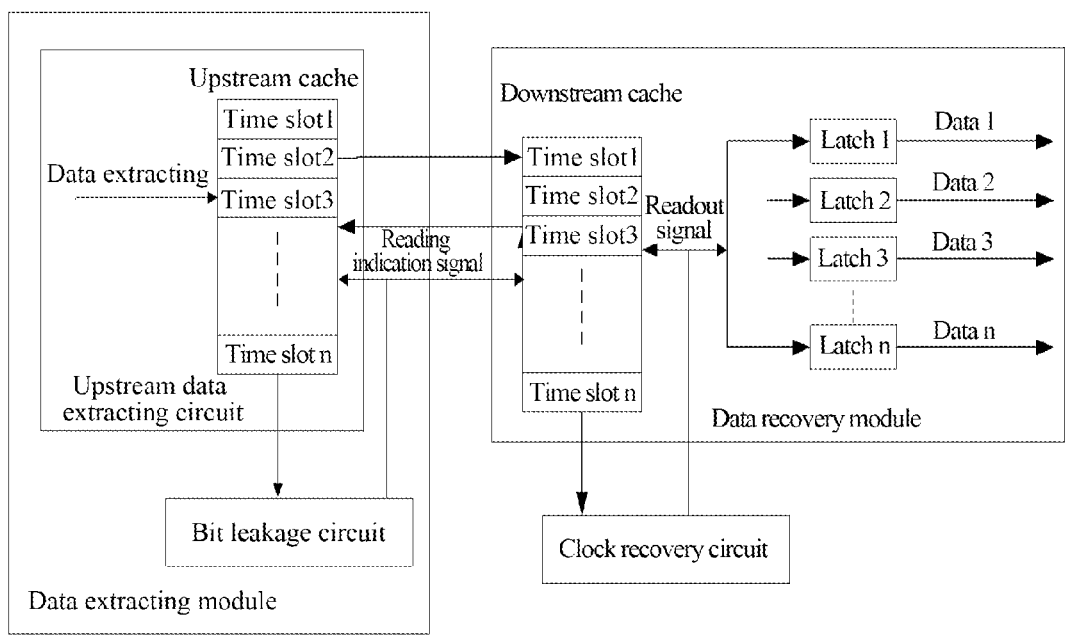
FIG. 4 is a structure diagram of a device for recovering clock data of a tributary signal in SDH according to the embodiment.

As shown in FIG. 4, the embodiment provides a device for recovering clock data for tributary signals in SDH, which comprises that:

a data extracting module, configured to extract valid data of a signal from a time slot of each tributary in a synchronous digital hierarchy (SDH) frame structure, and store into a storage space corresponding to a time slot of each tributary in caches, Taking the E1 signal as an example, the cache is divided according to the number of time slots of E1 in the SDH frame structure, there are 63 E1s in STM-1, the RAM is divided into 63 independent parts, data of each E1 time slot are saved in corresponding storage spaces in the RAM respectively;

a clock recovery circuit, configured to recover a clock signal and a readout signal for a time slot of each tributary by means of time division multiplexing, and send the clock signal and the readout signal to a data recovery module; and the data recovery module, configured to receive the clock signal and the readout signal, and when a readout signal for a time slot of any tributary is valid, read out contents of data from the storage space corresponding to the time slot of the tributary in the caches, and latch into a latch corresponding to the time slot.

Wherein, the caches include an upstream cache RAM_A and a downstream cache RAM_B, the upstream cache RAM_A is located in the data extracting module, the downstream cache RAM_B is located in the data recovery module; and wherein the data extracting module comprises:

an upstream data extracting circuit, configured to extract valid data of a signal from a time slot of each tributary in the SDH frame structure, and firstly store the valid data into a storage space corresponding to a time slot of each tributary in the upstream cache; and a bit leakage circuit, configured to generate a reading indication signal for a time slot of each tributary by means of time division multiplexing, uniformly read out contents of data of a time slot of each tributary from the upstream cache according to the reading indication signal, and write the contents of the data into a storage space corresponding to a time slot of each tributary in the downstream cache.

Wherein, the bit leakage circuit generates a reading indication signal for a time slot of each tributary by means of time division multiplexing, uniformly reads out contents of data of a time slot of each tributary from the upstream cache according to the reading indication signal in the following way:

it is to divide a clock period included in one SDH frame into M time segments, wherein, M is a positive integer, the number of bits of a time slot of each tributary is M−1, M or M+1, generate a reading indication signal for a time slot of each tributary at each time segment by means of time division multiplexing, every time a reading signal is generated, it is to read out one-bit data of a corresponding time slot:

for a time slot of each tributary of which the number of bits is M, it is to generate a reading indication signal for normal leakage once at each time segment of M time segments, read out one-bit data;

for a time slot of each tributary of which the number of bits is M−1, it is to generate a reading indication signal for normal leakage once at each time segment of M−1 time segments, read out one-bit data;

for a time slot of each tributary of which the number of bits is M+1, it is to generate a reading indication signal for normal leakage once at each time segment of M time segments, and generate a reading indication signal for leakage adding once at one of the time segments, and pre-dividing time segments at which a reading indication signal for leakage adding can be generated for a time slot of each tributary in the SDH frame, it is to ensure that the number of clock periods included in each time segment is always not less than the maximum number of reading indication signals which are probably generated.

Taking the E1 signal as an example, for the STM-1 serial data stream, the frequency of clock signal is 155.52M, the time length of one frame is 125 us, in the time length of one frame, there are 19440 clock periods. For one E1 signal, there are 256 bits in one STM-1 period (when there is only one S1 to bear data, it is 256 bits; when there are 2 S1s to bear data, it is 257 bits, when two S1s don't bear data, it is 255 bits). 19440 clock periods are divided into multiple time segments according to the way in FIG. 4, wherein, the first time segment is 75 clock periods, other 15 segments (the second time segment to the fifth time segment) are all 76 clock periods, which are divided circularly in turn. Thus, 19440 clock periods can be divided into 16 time segments of 75 clock periods, and 16*15 time segments of 76 clock periods, and there are total 256 time segments. In one STM-1 period, when each E1 signal has 256 bits (or 255, 257 bits), in each time segment, data can be uniformly leaked from the upstream cache to the downstream cache by leaking one bit from the upstream cache to the downstream cache. Compared with that data of a time slot of each tributary are centrally distributed in fixed time slot positions in the SDH frame structure, the uniform leakage here, that is, it is to read out contents of data of a time slot of each tributary from the upstream cache, represents that, the data bits of the time slot of each tributary have been uniformly distributed on the readout time intervals, but since the phenomenon of the leakage decreasing or the leakage adding exist, the readout times of the data bits are not in completely equal intervals.

When the E1 signal only has 255 bits (both S1 and S2 do not bear data) in one STM-1 period, and in 256 time segments, there is one time segment in which no data is leaked (the activity of not leaking data is known as leakage decreasing), thus the number of bits leaked to the downstream is decreased by 1, i.e., 255 bits. When the E1 signal has 257 bits (both S1 and S2 bear data) in one STM-1 period, then in 256 time segments, there is one time segment in which two bit are leaked (the activity of leaking more data is known as leakage adding), thus the number of bits leaked to the downstream is added by 1, i.e., 257 bits. There are many ways to divide time segments, as long as it is ensured that the number of the clock periods included in each time segment is greater than 63, and the 19440 clock periods are divided into 256 time segments.

Figure 5:
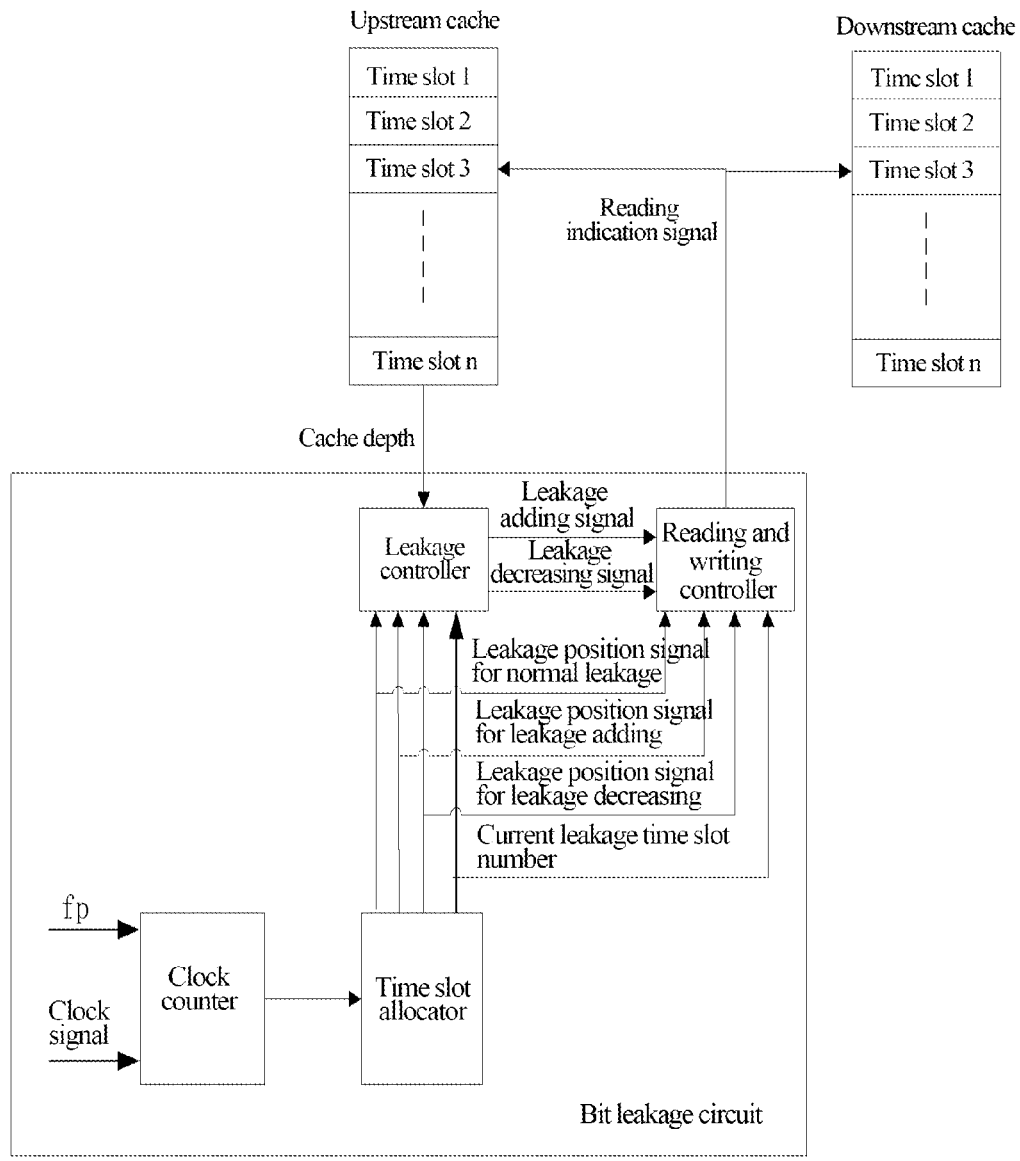
FIG. 5 is a structure diagram of a bit leakage circuit of the device for recovering clock data according to the embodiment.

As shown in FIG. 5, in one application example, the bit leakage circuit comprises:

one or more clock counters, wherein the counter is configured to take a frame head signal as a reference to count;

a time slot allocator, configured to determine leakage positions for normal leakage, leakage adding or leakage decreasing in each time segment and a current leakage time slot number according to an output result of the counter;

a reading and writing controller, configured to, according to leakage positions for normal leakage, leakage adding or leakage decreasing (norm_pos, add_pos, dec_pos) in each segment and a current leakage time slot number (leak_slot_num), at each segment, normally leak data once or add data leakage once or decrease data leakage once from the storage space corresponding to time slot number in the upstream cache to the storage space corresponding to time slot number in the downstream cache according to the current leakage time slot number, wherein, a reading indication signal is generated upon the normal leakage, a reading indication signal for the normal leakage is deducted upon decreasing the leakage; a reading indication signal is added at the leakage position for the leakage adding upon adding the leakage.

Wherein, the bit leakage circuit further comprises:

a leakage controller, configured to generate a leakage adding signal (add) and a leakage decreasing signal (dec) according to a cache depth of a storage space in the upstream cache corresponding to a time slot number, wherein, the leakage adding signal (add) represents adding leakage once; the leakage decreasing signal (dec) represents decreasing leakage once;

The RAM cache depth represents the amount of data, when the amount of data is too large, it is necessary to add the leakage speed, the larger the amount of data, the higher the frequencies of adding leakage; when the amount of data is too small, it is necessary to decrease the leakage, the less the amount of the data, the lower the frequencies of leakage. For example, when the leak_slot_num equals to the corresponding time slot number, when the amount of the data of the corresponding time slot is too large, the add is generated on the norm_pos or add_pos position, when the amount of data is too small, the dec is generated on the dec_pos position;

a reading and writing controller, configured to, according to leakage positions for normal leakage, leakage adding or leakage decreasing in each segment and a current leakage time slot number, a leakage adding signal (add), a leakage decreasing signal (dec), at each segment, add data leakage once according to the leakage adding signal or decrease dada leakage once according to the leakage decreasing signal from the storage space corresponding to the time slot number in the upstream cache RAM_A to the storage space corresponding to the time slot number in the downstream cache RAM_B according to the current leakage time slot number, wherein, a reading indication signal for the normal leakage is deducted upon decreasing the leakage; a reading indication signal is added at the leakage adding position upon adding the leakage.

The bit leakage circuit relatively uniformly leaks the data of the signal for the time slot of each tributary from the upstream cache to the downstream cache by controlling reading operation times, and recovers the data and the clock information of the signal for the time slot of each tributary in the downstream.

Figure 6:
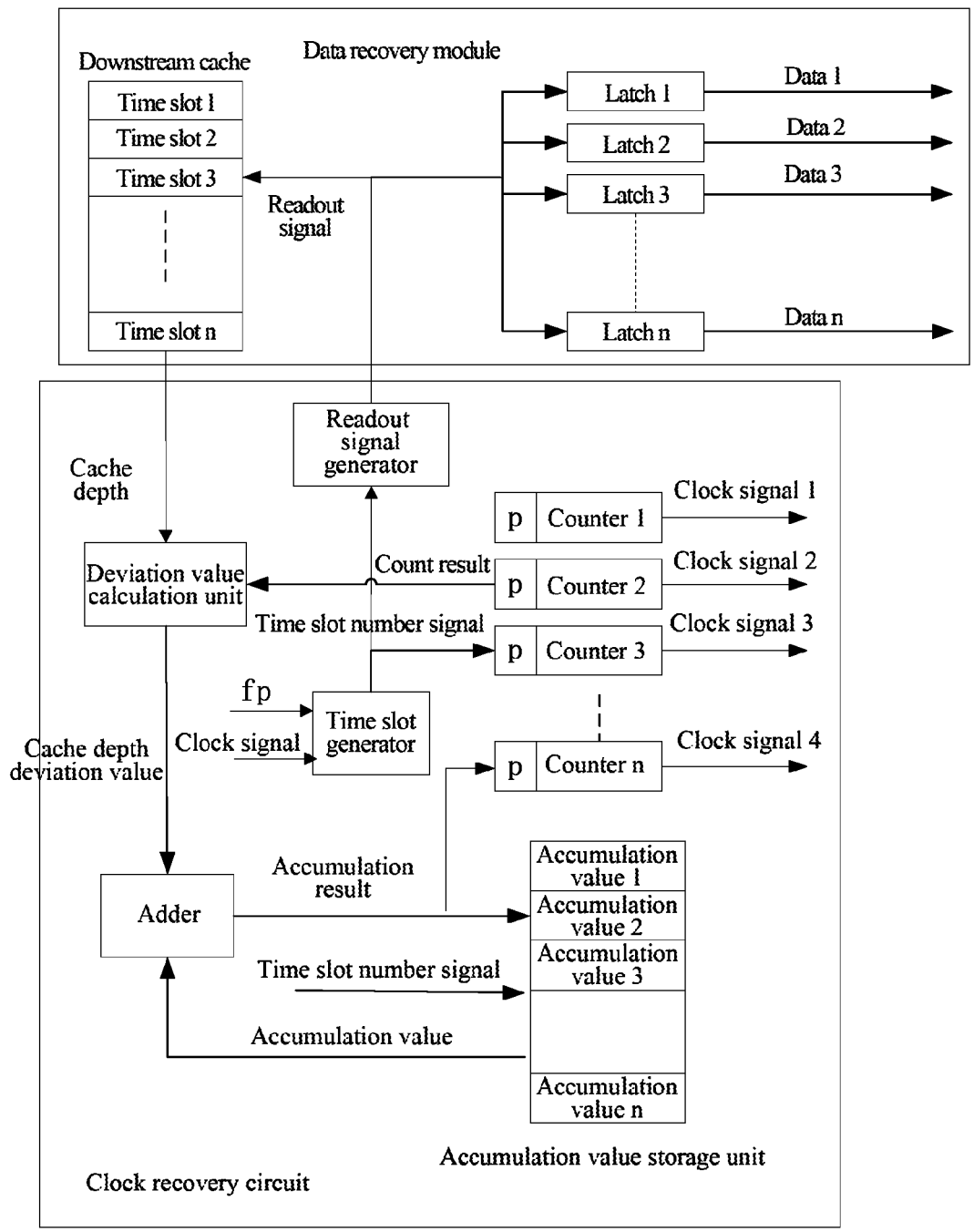
FIG. 6 is a structure diagram of a clock recovery circuit and a data recovery module of the device for recovering clock data according to the embodiment.

As shown in FIG. 6, in one application example, the clock recovery circuit comprises:

a deviation value calculation unit, configured to calculate a cache depth deviation value of a time slot of each tributary circularly by means of time-division multiplexing, accumulate the cache depth deviation values, obtain an overflow flag of a time slot of each tributary;

one counter set for a time slot of each tributary, wherein the counter is configured to recover the clock signal for the time slot of the tributary according to the overflow flag; the counter is numbered according to the time slot number, each counter comprises two parts: an overflow flag and a counter n (n represents a time slot number), for E1 signal, there are 63 counters;

an accumulation value storage unit, configured to store an accumulation of last time output by the deviation value calculation unit of a time slot of each tributary into a storage space corresponding to a time slot of each tributary;

a time slot generator, configured to generate a time slot number signal (slot_num) according to a frame head signal fp and a clock signal, wherein the time slot number signal (slot_num) continuously cycles from 1 to n, n is a positive integer which is determined by the number of time slots in the SDH frame structure (the number of the tributaries of the signal carried by the SDH frame structure);

wherein the deviation value calculation unit calculates a cache depth deviation value of a time slot of each tributary circularly by means of time-division multiplexing, accumulates the cache depth deviation values, obtains an overflow flag of a time slot of each tributary in the following way:

the deviation value calculation unit obtains a data cache depth (depth_b) of a storage space corresponding to a current time slot number and a count result (counter) of a counter corresponding to the current time slot number from the downstream cache RAM_B according to a current time slot number signal (slot_num), performs an operation to obtain a cache depth deviation value of the time slot of the tributary;

it is to obtain an accumulation value (accumulation) of last time from a storage space corresponding to a current time slot number of the accumulation value storage unit according to a current time slot number signal (slot_num), accumulate the cache depth deviation value of the time slot of the tributary with the accumulation value of last time, obtain an accumulation result (total) of the time slot of the tributary;

it is to judge whether an accumulation of this time is overflowed according to the accumulation result (total), if the accumulation is overflowed, it is to mark an overflow flag on a counter corresponding to a current time slot number, meanwhile store a remainder of the accumulation result of this time into a storage space corresponding to a current time slot number of the accumulation value storage unit as an accumulation value for a next operation.

For the E1 signal, the slot_num continuously cycles from 1 to 63, which represents the time slot numbers of 63 E1 tributary signals required to be recovered. The time slot number signal (slot_num) represents that the clock signal for the time slot of any tributary is being recovered currently, the operation process of the overflow flag of the time slot of the tributary is completed within one clock period. For example, for the time slot of the first tributary, when the slot_num is 1, the operation process of the time slot of the first tributary is completed, at next clock period, when the slot_num is 2, the operation process of the time slot of the second tributary is completed, and so on, it is to continuously cycle to complete the accumulation operation processes of all time slots.

Wherein, the process for calculating the cache depth deviation value is as follows:

the deviation calculation unit performs subtraction on the data cache depth (depth_b) value and a depth reference value to obtain an integer part of a data cache depth deviation calculation value (depth_dev). The count result (counter) is a decimal part of the depth deviation calculation value (depth_dev); wherein, the count result (counter) of the counter is a count result after the counter is cleared to zero last time, until the counter is read currently.

It is to concatenate the integer part and decimal part of the data cache depth deviation calculation value (depth_dev) (the integer part is in the front, and the decimal part is behind the integer part) to be added with a reference clock standard value to obtain the cache depth deviation value (deviation).

The depth deviation calculation value (depth_dev) represents a deviation direction and a size of the current cache depth: if the deviation value is positive, it represents that the amount of the cache data is relatively large, and the amount of the data stored in the upstream is increasing, the clock frequency required to be recovered is sped up so as to speed up the speed of reading out the data from the cache. The size of the deviation value reflects degrees of the recovery clock changes. If the deviation value is negative, it reflects that the amount of the data stored in the upstream is decreasing, the clock frequency required to be recovered is slowing down to slow down the speed of reading out the data from the cache. A target reference standard value is related to the current clock, deviation value bit.

The cache depth deviation value (deviation) reflects a recovery rate when the clock is recovered in next cycle. It is to uninterruptedly accumulate the deviation value, when the accumulation is performed, if an overflow phenomenon occurs, an allowance after overflowed is uninterruptedly accumulated with the deviation value. The larger the cache depth deviation value is, the more the overflow times is; the smaller the cache depth deviation value is, the less the overflow times is, therefore the accumulation overflow times reflects the frequency of the recovery clock. The frequency of the recovery clock can be adjusted by the overflow times.

It is to set an overflow threshold, whether the accumulation of this time is overflowed is judged by whether the accumulation result (total) reaches the threshold, the overflow threshold is related to the clock frequency and the data cache depth (depth_b).

Wherein, the counter of the time slot of each tributary recovers the clock signal for the time slot of the tributary according to the overflow flag in the following way:

the counter of the time slot of each tributary respectively takes a frame head signal as a reference, and performs plus-1-counting from zero according to the clock signal;

when an overflow flag p of the counter is valid, it is to clear the counter to zero when a count of the counter reaches a standard value, when an overflow flag p of the counter is invalid, it is to clear the counter to zero when a count of the counter reaches a standard value+1, then the counter restarts to count from zero, when the counter is cleared to zero, the overflow flag is cleared at the same time; wherein, the standard value is determined by a frequency of the clock signal and a nominal frequency of each tributary signal in the SDH frame structure; and when the counter is cleared to zero, a clock pulse is generated.

Taking the E1 signal as an example, the clock signal frequency of one STM-1 frame is 155.52M, a nominal clock frequency of each E1 tributary signal is 2.048M, the clock frequency of one STM-1 frame is divided by the nominal frequency of each E1 tributary signal to obtain the target value of the counter of which the count is cleared to zero is 74 (the count is started from 0, when the count reaches 74, the total count is 75 times, that is, 75 frequency division), if an overflow flag of the counter is invalid, the counter is cleared to zero when a count of the counter reaches the target value 74+1, that is, it is cleared to zero when the accumulation value reaches 75, then the counter restarts to count from zero, when the overflow flag of the counter is valid, the counter is cleared to zero only when the count of this time reaches the target value, then the counter restarts to count from zero, every time the counter is cleared to zero, it represents that the counter has completed one count period, and the counter outputs one clock pulse, and the pulse is a recovery clock pulse of the current time slot.

When there is an overflow flag, the counter is cleared to zero as long as the count reaches the target value, the count time is short, and the time for generating the pulse is fast; when there is no overflow flag, the counter is cleared to zero only when the count reaches the target value+1, the count time is long, and the time for generating the pulse is slow. Therefore, the more the overflow flags are, the shorter the count time of the counter is, the faster the time for generating the pulse is, the more the amount of pulses generated within the fixed time is, and the higher the recovery clock frequency is; and conversely, the less the overflow flags are, the longer the count time of the counter is, the slower the time for generating the pulse is, and the less the amount of the pulses generated within the fixed time is, and the lower the recovery clock frequency is. The recovery clock frequency can be adjusted by the overflow times, the clock signals of the service can be uniformly recovered according to the amount of the data cache by that way.

Moreover, the clock recovery circuit further comprises:

a readout signal generator, configured to, when the time slot number signal (slot_num) is generated, generate a readout signal for a time slot of each tributary at the same time and judge whether the readout signal is valid; wherein that a readout signal for a time slot of any tributary is valid means that: if a current time slot number signal (slot_num) is within the next cycle period, the counter corresponding to a time slot number will generate a recovery clock pulse, and the readout signal is valid;

Taking the E1 signal as an example, the slot_num continuously cycles from 1 to 63, when the counter which counts for one period is cleared to zero, one recovered pulse is generated, and one count period is 75 or 74, the principle for that the readout signal is valid is that: when the system needs to recover the time slots of 63 tributaries, it needs 63 clock periods when the slot_num cycles each time, for the time slot of the first tributary, from the time when the slot_num is 1 to the time when the slot_num is 1 again, 63 clock periods are required. When the difference between the current value of the counter and the target value of the counter is greater than 63, it means that the counter will not count to the target value during the time after the slot_num cycles from 1 for one cycle until the slot_num equals to 1 again, that is, the recovery clock pulse of the current time slot cannot be generated, under that condition, it is not required to prepare to recover the data, therefore the readout signal is invalid under that condition; when the difference between the current value of the counter and the target value of the counter is less than 63, it means that the counter will count to the target value during the time after the slot_num cycles from 1 for one cycle until the slot_num equals to 1 again, the recovery clock pulse of the current time slot is generated, therefore, the readout signal is valid under that condition.

As shown in FIG. 6, besides the downstream cache RAM_B, the data recovery module further comprises: a latch set for a time slot of each tributary, which is configured to save contents of data in the storage space corresponding to a time slot number read from the downstream cache; wherein, the latch is numbered according to a time slot number; and when a readout signal for a time slot of any tributary is valid, the data recovery module reads out contents of data from the storage space corresponding to the time slot of the tributary in the caches, and latches into a latch corresponding to the time slot in the following way, which comprises that:

when a readout signal for the time slot of any tributary is valid, it is to read out contents of data in a storage space corresponding to the time slot number from the downstream cache according to a current time slot number signal(slot_num) and a readout signal, and latch into a latch corresponding to the time slot number.

Figure 7:
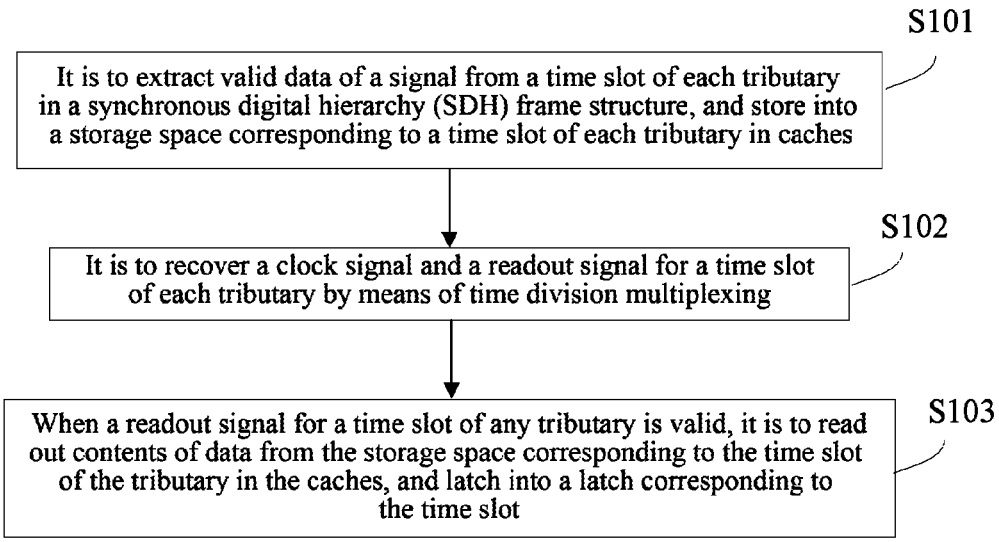
FIG. 7 is a flowchart of a method for recovering clock data of the tributary signal in SDH according to the embodiment.

As shown in FIG. 7, the embodiment provides a method for recovering clock data of a tributary signal in SDH comprising the following steps:

in step S101, it is to extract valid data of a signal from a time slot of each tributary in a synchronous digital hierarchy (SDH) frame structure, and store into a storage space corresponding to a time slot of each tributary in caches;

in step S102, it is to recover a clock signal and a readout signal for a time slot of each tributary by means of time division multiplexing; and in step S103, when a readout signal for a time slot of any tributary is valid, it is to read out contents of data from the storage space corresponding to the time slot of the tributary in the caches, and latch into a latch corresponding to the time slot.

Wherein, the caches RAM comprise an upstream cache RAM_A and a downstream cache RAM_B, the step S101 further comprises the following steps:

it is to extract valid data of a signal from a time slot of each tributary in the SDH frame structure, and firstly store the valid data into a storage space corresponding to a time slot of each tributary in the upstream cache;

it is to generate a reading indication signal for a time slot of each tributary by means of time division multiplexing, uniformly read out contents of data of a time slot of each tributary from the upstream cache according to the reading indication signal, and write into a storage space corresponding to a time slot of each tributary in the downstream cache.

Wherein, generating a reading indication signal for a time slot of each tributary by means of time division multiplexing, uniformly reading out contents of data of a time slot of each tributary from the upstream cache according to the reading indication signal, comprises that:

it is to divide a clock period included in one SDH frame into M time segments, wherein, M is a positive integer, the number of bits of a time slot of each tributary is M−1, M or M+1; generate a reading indication signal for a time slot of each tributary at each time segment by means of time division multiplexing; every time a reading signal is generated, read out one-bit data of a corresponding time slot:

for a time slot of each tributary of which the number of bits is M, it is to generate a reading indication signal for normal leakage once at each time segment of M time segments, read out one-bit data;

for a time slot of each tributary of which the number of bits is M−1, it is to generate a reading indication signal for normal leakage once at each time segment of M time segments, read out one-bit data;

for a time slot of each tributary of which the number of bits is M+1, it is to generate a reading indication signal for normal leakage once at each time segment of M time segments, and generate a reading indication signal for leakage adding once at one of the time segments, and pre-divide time segments at which a reading indication signal for leakage adding can be generated for a time slot of each tributary in the SDH frame, ensure that the number of clock periods included in each time segment is always not less than the maximum number of reading indication signals which are probably generated.

Wherein, as an alternative way, in the step S102, recovering a clock signal for a time slot of each tributary by means of time division multiplexing, further comprises that:

it is to calculate a cache depth deviation value of a time slot of each tributary circularly by means of time division multiplexing, and accumulate the cache depth deviation values, and obtain an overflow flag of a time slot of each tributary;

a time slot of each tributary independently recovers the clock signal for the time slot of the tributary respectively according to its overflow flag.

Wherein, calculating a cache depth deviation value of a time slot of each tributary circularly by means of time division multiplexing, and accumulating the cache depth deviation values, obtaining an overflow flag of a time slot of each tributary, comprises that:

it is to generate a time slot number signal (slot_num) according to the frame head signal and clock signal, wherein the time slot number signal (slot_num) continuously cycles from 1 to n, n is a positive integer which is determined by the number of time slots in the SDH frame structure (i.e., the number of tributaries of the signal born in the SDH frame structure);

it is to calculate a cache depth deviation value of a time slot of a current tributary according to a current time slot number signal (slot_num), accumulate the cache depth deviation values, if accumulation is overflowed, it is to generate an overflow flag of the time slot of the current tributary.

As an alternative way, the method further comprises that:

it is to set an accumulation value storage unit, and set a counter for a time slot of each tributary, wherein the accumulation value storage unit can be divided according to the number of the time slots of E1 in the SDH frame structure, the counter is numbered according to the time slot number, the counter includes an overflow flag;

calculating a cache depth deviation value of a time slot of each tributary circularly, and accumulating the cache depth deviation values, obtaining an overflow flag of a time slot of each tributary, further comprises that:

the time slot generator generates a time slot number signal (slot_num) according to the frame head signal (fp) and clock signal (clock), wherein the time slot number signal (slot_num) continuously cycles from 1 to n;

Taking the E1 signal as an example, the slot_num cycles from 1 to 63.

It is to obtain a data cache depth (depth_b) of a storage space corresponding to a current time slot number and a count result (counter) of a counter corresponding to the current time slot number from the downstream cache RAM_B according to a current time slot number signal (slot_num), and obtain a cache depth deviation value of the time slot by performing an operation;

it is to obtain an accumulation value (accumulation) of last time from a storage space corresponding to a current time slot number of the accumulation value storage unit according to a current time slot number signal (slot_num), accumulate the cache depth deviation value (deviation) of the time slot of the tributary with the accumulation value of last time, obtain an accumulation result (total) of the time slot of the tributary;

it is to judge whether the accumulation of this time is overflowed according to the accumulation result (total), if the accumulation is overflowed, it is to mark an overflow flag on a counter corresponding to a current time slot number, meanwhile store a remainder of the accumulation result of this time into a storage space corresponding to a current time slot number of the accumulation value storage unit as an accumulation value for a next operation.

Wherein, the process for calculating the cache depth deviation value (deviation) is as follows:

it is to perform subtraction on the data cache depth (depth_b) value and a depth reference value to obtain an integer part of a data cache depth deviation calculation value (depth_dev); the count result (counter) of the counter is a decimal part of the depth deviation calculation value (depth_dev). Wherein, the counter result (counter) of the counter is a counter result after the counter is cleared to zero last time until the counter is read currently.

It is to concatenate the integer part and decimal part of the data cache depth deviation calculation value (depth_dev) (the integer part is in the front, and the decimal part is behind the integer part), and the cache depth deviation value (deviation) is obtained by adding the depth deviation calculation value (depth_dev) with a reference clock standard value.

Wherein, a time slot of each tributary independently recovering the clock signal for the time slot of the tributary according to its overflow flag respectively, comprises that:

the counter of the time slot of each tributary respectively takes a frame head signal as a reference, and performs plus-1-counting from zero according to the clock signal;

when an overflow flag of the counter is valid, it is to clear the counter to zero when a count of the counter reaches a standard value, when an overflow flag of the counter is invalid, it is to clear the counter to zero when the count of the counter reaches the standard value+1, then the counter restarts to count from zero, it is to clear the overflow flag while the counter is cleared to zero, wherein, the standard value is determined by a frequency of the clock signal and a nominal frequency of each tributary signal in the SDH frame structure;

when the counter is cleared to zero, it is to generate a recovery clock pulse.

Wherein, as an alternative way, in the step S102, recovering a readout signal for a time slot of each tributary by means of time division multiplexing, further comprises that:

while the time slot number signal (slot_num) is generated, it is to generate a readout signal for a time slot of each tributary;

wherein, the step S103 further comprises that:

when a readout signal for the time slot of any tributary is valid, it is to read out contents of data from a storage space corresponding to the time slot number in the downstream cache according to a current time slot number signal (slot_num) and a readout signal, and latch into a latch corresponding to the time slot number; wherein, a readout signal in a time slot of any tributary being valid comprises that: if a current time slot number signal (slot_num) is within a next cycle period, a counter corresponding to the time slot number will generate a clock pulse, the readout signal is valid.

Figure 8:
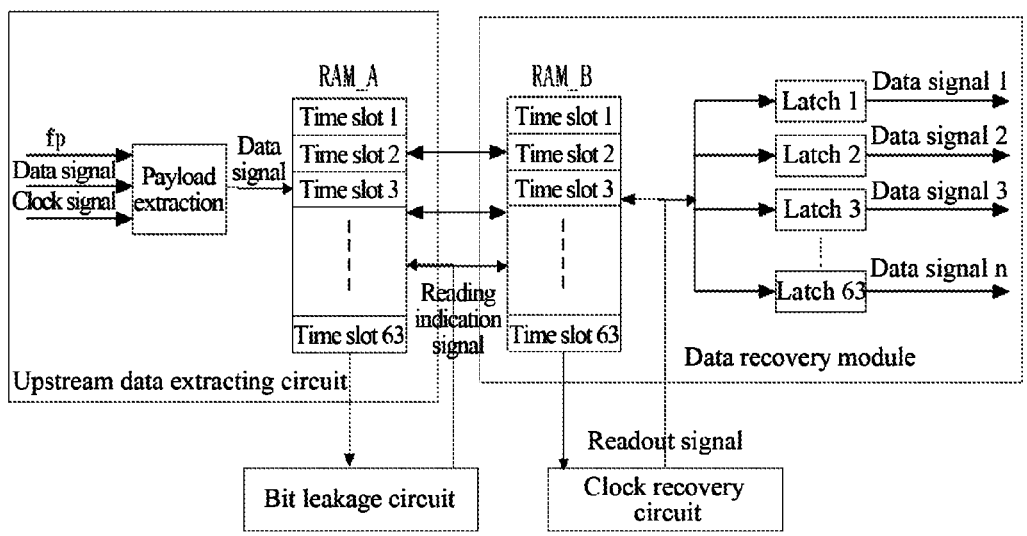
FIG. 8 is a structure diagram of a device for recovering clock data of the tributary signal in SDH according to an application example.
Figure 9:
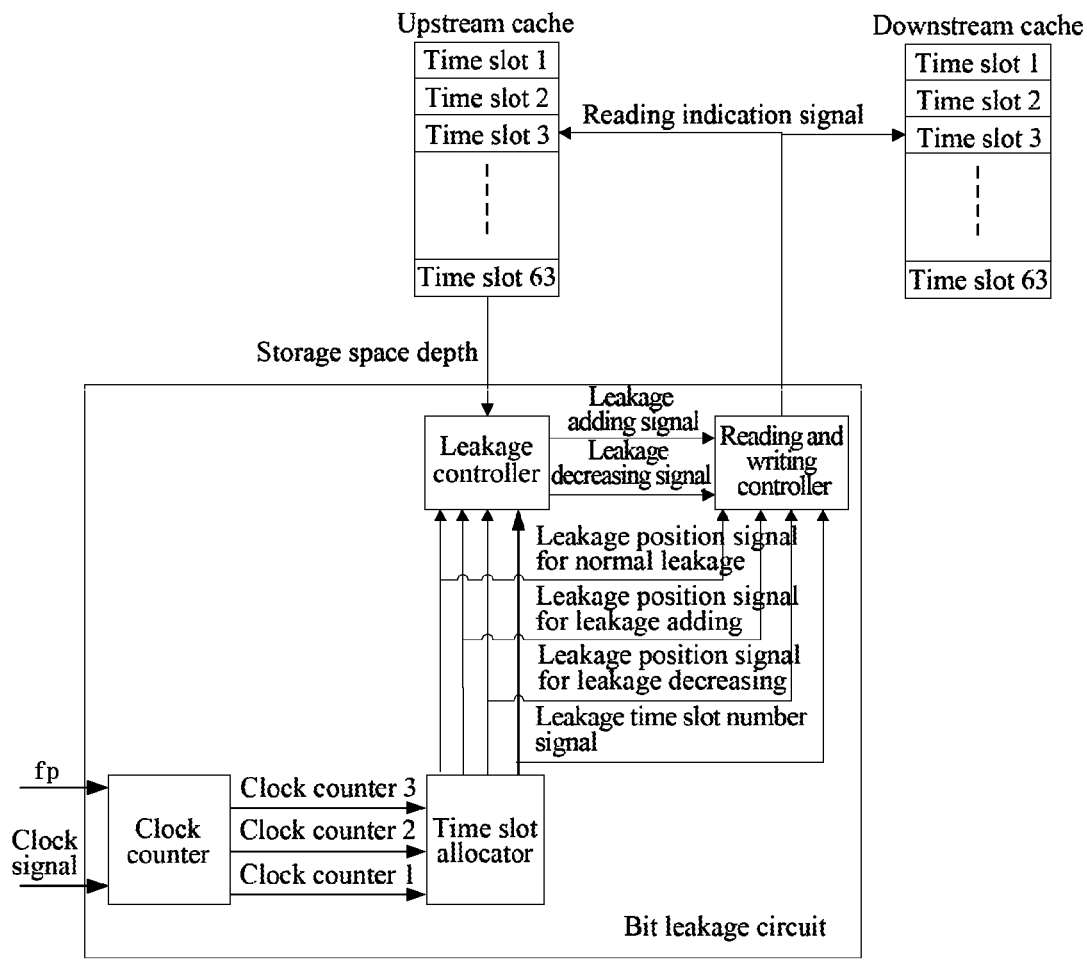
FIG. 9 is a structure diagram of a bit leakage circuit of the device for recovering clock data according to an application example.
Figure 10:
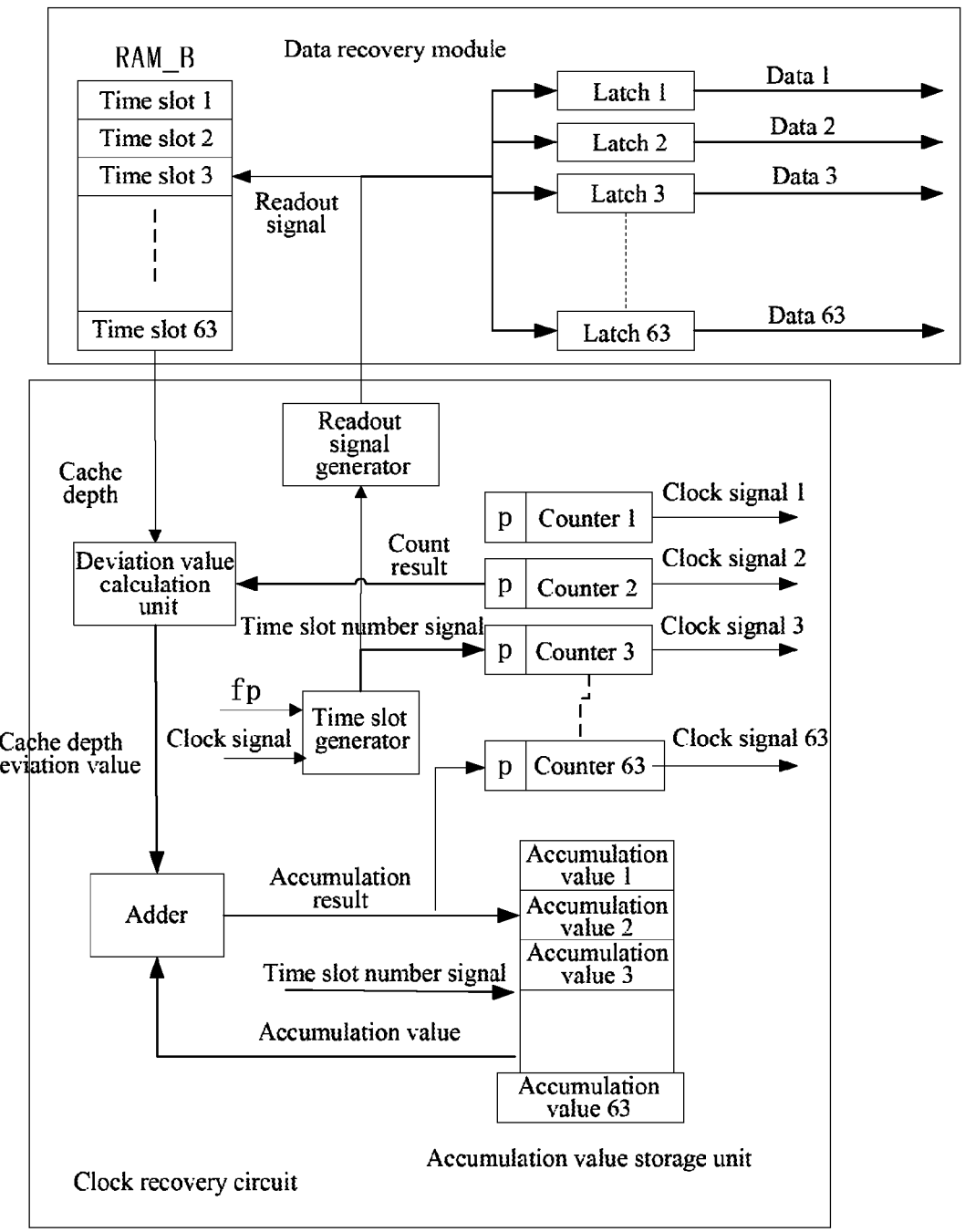
FIG. 10 is a structure diagram of a clock recovery circuit and a data recovery module of the device for recovering clock data according to an application example.

In one application example, the embodiment of the present document is described in details by taking the frame structure, E1 signal of STM-1 level as examples and combining with FIGS. 8-10, and as shown in FIG. 8, a device for recovering clock data for tributary signals in SDH comprises: an upstream data extracting circuit, a bit leakage circuit, a clock recovery circuit and a data recovery module, wherein:

the upstream data extracting circuit extracts the valid data of the signal from the time slot of each tributary in the SDH frame according to the frame head signal (fp), clock signal (clock) and data signal (data), and stores the valid data into the cache corresponding to the time slot number in the upstream cache RAM_A;

the upstream data extracting circuit judges whether S1 bit and S2 bit are valid data according to the contents of C1 bit and C2 bit. If the positions of S1 bit, S2 bit are valid data, they are required to be extracted out and stored in the cache of the time slot. The cache RAM_A is divided according to the number of time slots of E1 in the SDH, there are 63 E1 signals in the STM-1, the RAM_A is divided into 63 independent parts, data of each E1 time slot are saved in corresponding storage spaces in the RAM respectively.

The bit leakage circuit is configured to generate a reading indication signal for a time slot of each tributary by means of time division multiplexing, uniformly read out contents of data of a time slot of each tributary from the upstream cache RAM_A according to the reading indication signal, and write into a storage space corresponding to a time slot of each tributary in the downstream cache RAM_B. The way for dividing the RAM_B is the same with that of the RAM_A.

Figure 11:
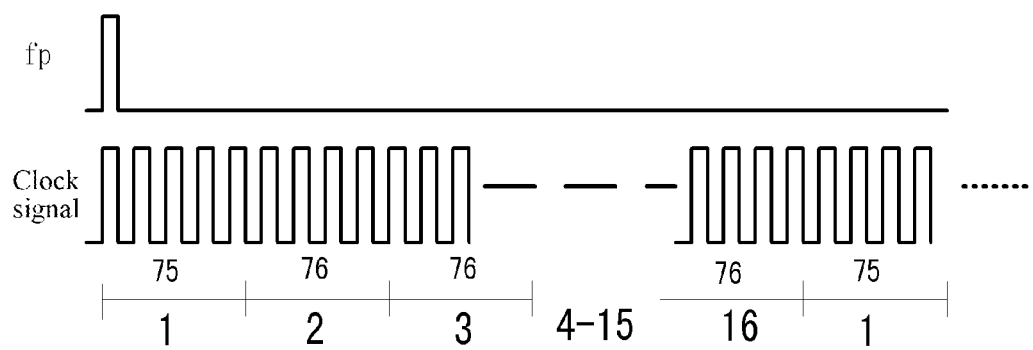
FIG. 11 is a schematic diagram of a way for dividing one STM-1 frame into time segments according to an application example.
Figure 12:
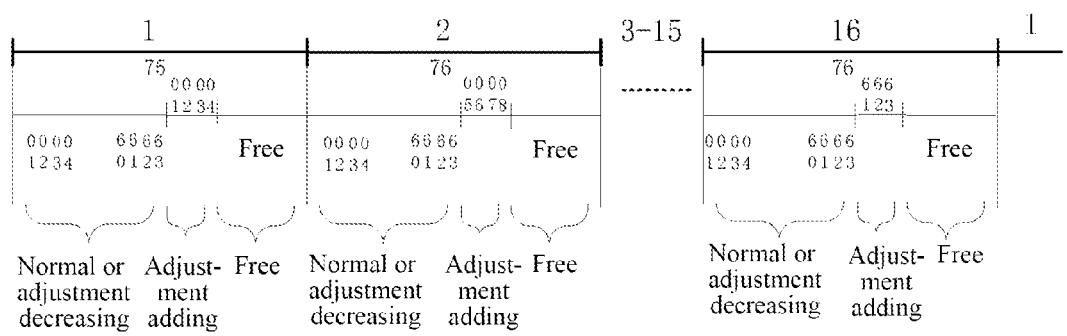
FIG. 12 is a schematic diagram of a leakage position of each E1 tributary signal in each time segment according to an application example.

As an alternative way, and as shown in FIG. 9, the bit leakage circuit comprises: 3 clock counters, a time slot allocator, a leakage controller and a reading and writing controller, wherein:

as an alternative way but not an exclusive way for dividing the time segments, a way for dividing the time segments is given out in FIG. 11. As shown in FIG. 11, 19440 clock periods in the time length of one STM-1 frame are divided into multiple time segments, wherein, the first time segment is 75 clock periods, other 15 segments (the second time segment to the fifth time segment) are all 76 clock periods, which are divided circularly in turn. Thus, 19440 clock periods can be divided into 16 time segments of 75 clock periods, and 16*15 time segments of 76 clock periods, and there are total 256 time segments. In one STM-1 period, when each E1 signal has 256 bits (or 255, 257 bits), in each time segment, data can be uniformly leaked from the upstream RAM_A to the downstream RAM_B by extracting and leaking one bit from the upstream data RAM_A to the data recovery RAM_B. When the E1 signal only has 255 bits (both S1 and S2 do not bear data) in one STM-1 period, and in 256 time segments, there is one time segment in which no data is leaked (the activity of not leaking data is known as leakage decreasing), thus the number of bits leaked to the downstream is decreased by 1, i.e., 255 bits. When the E1 signal has 257 bits (both S1 and S2 bear data) in one STM-1 period, then in 256 time segments, there is one time segment in which two bit are leaked (the activity of leaking more data is known as leakage adding), thus the number of bits leaked to the downstream is added by 1, i.e., 257 bits. Since there are at least 75 clock periods in one time segment, and there are at most 63 E1 tribuxary signals in one STM-1 frame, therefore one time segment can satisfy the normal leakage requirements of 63 E1 tributary signals. Under an extreme case, in the STM-1 frame, all 63 E1 tributary signals have 257 bits simultaneously, if all E1 signals require to leak 2 bits (once for normal leakage and once for leakage adding) in the same time segment, there are total 2*63=126 bits which are required to be leaked in one time segment, but there are only 75 or 76 clock periods in one time segment which are unable to be used for leaking 126 bits. Since there are 256 time segments in one STM-1 frame, and each E1 can leak at most one more bit in one STM-1 period, therefore the activities of leakage adding for 63 E1 tributary signals are artificially scattered to 256 time segments, and it is only required to add the leakage for a few E1 signals in each time segment, and as shown in FIG. 12, for example, each time segment is only responsible for leakage adding for at most 4 E1 tributary signals, therefore, the normal leakage requirements of all E1 signals can be satisfied in one time segment. It is to divide one time segment into 3 parts, which are a normal leakage part/ leakage decreasing part, a leakage adding part and a leakage free part. In the normal leakage, if it is required to decrease the leakage, the normal leakage is deducted, and leakage of one bit is decreased, which achieves a leakage decreasing function. As shown in FIG. 12, in the first 15 time segments, each time segment is only responsible for leakage adding for 4 E1 tributary signals, which are 1st-4th, 5th-8th, 9th-12th . . . 57th-60th E1 tributary signals, and 16th time segment is only responsible for leakage adding for 61th-63th E1 tributary signals. Thus the first 16 segments can complete the requirements of leakage adding for all 63 E1 tributary signals. The activity of leakage adding is not arranged in other time segments. In specific implementations, the way of dividing the time segments and in which time segment the leakage adding is arranged to be implemented is not limited to the way given in the embodiment, for example, in the first 63 time segments, each time segment can be only responsible for leakage adding for 1 E1 tributary signal.

As shown in FIG. 9, the clock counter counts the clock signal (clock) according to the frame head signal (fp) of SDH, when the frame head signal fp reaches, the counter is cleared to zero completely to restart to count the clocks. For the E1 signal, the clock counter counts according to the above way of dividing segments.

In the application example, 3 clock counters are set, which comprise: a clock counter 1 (counter_low), a clock counter 2 (counter_middle) and a clock counter 3 (counter_high), but it is not excluded to set multiple clock counters in the implementation.

The clock counter (counter_low) counts from 1 to 75/76; the counters (counter_middle and counter_high) are used to count the time segments, both count from 1 to 16, and it is to count from 1 to 256 in combination, when the counter_middle counts for one cycle, the counter_high just counts once. The counter_middle decides whether the maximum count value of the counter_low is 75 or 76. In FIG. 7 and FIG. 8, when the counter_middle is 1, the maximum count value of the counter_low is 75, the counter counter_low counts to 76 under other conditions. The counter_high decides whether the leakage adding or the leakage decreasing exists. In the application example, only when the counter_high is 1, there is possible leakage adding or leakage decreasing in the time segment, when the counter_high is another value, there is only normal leakage, and there is no leakage adding or leakage decreasing. Thus, it is ensured that in the STM-1 period, 19440 clock periods can be divided into 16 time segments of 75 clock periods, and 16*15 time segments of 76 clock periods, and there are total 256 time segments.

The time slot allocator in the bit leakage circuit determines the leakage position for each E1 tributary signal. In FIG. 12, when the clock counter (counter_low) is in the range of 1-63, it represents normal leakage or leakage decreasing of each tributary signal. For example, when the counter_low is 1, it represents the position of the normal leakage or leakage decreasing of the first E1 tributary signal, each signal corresponds to each time slot; when the counter_low has other content, it represents the position of the leakage free, and there is no leakage. Since in one STM-1 frame, each E1 tributary signal (or a time slot of each tributary) has the leakage decreasing at most once, thus the leakage decreasing is just implemented in one time segment, the leakage decreasing is put in the first time segment in the application example. The activities of leakage adding for 63 E1 tributary signals are artificially scattered to 256 time segments, it is only required to add the leakage for a few E1 signals in each time segment, in the application example, in the first 15 time segments, the counts of the counter_low are 64, 65, 66, 67, which represent the leakage adding positions of the E1 signals. For example, in the first time segment, the counts of the counter_low are 64, 65, 66, 67 which represent the leakage adding positions of the 1st, 2nd, 3rd, 4th E1 tributary signals; in the second time segment, the counts of the counter_low are 64, 65, 66, 67 which represent the leakage adding positions of the 5th, 6th, 7th, 8th E1 tributary signals, and so on. In the 16 the time segment, the counts of the counter_low are 64, 65, 66 which represent the leakage adding positions of the 61th, 62th, 63th E1 tributary signals.

In the light of output results of the above 3 clock counters, according to generation mechanisms for normal leakage, leakage adding and leakage decreasing, the time slot allocator generates a leakage time slot number signal (leak_slot_num), a normal leakage position signal (norm_pos), a leakage adding position signal (add_pos) and a leakage decreasing position signal (dec_pos). These leakage position signals indicate the type of the leakage which can be performed at that position. The leak_slot_num indicates the time slot number of the current leakage. For the E1 signal, the valid range of the leak_slot_num is from 1 to 63. For example, in FIG. 12, in the first time segment, when the counter_low is in the range of 1-63, it represents the normal leakage or leakage decreasing of each tributary signal, the leak_slot_num corresponds to the time slot number of the current normal leakage or current leakage decreasing, which ranges from 1 to 63; when the counts of the counter_low are 64, 65, 66, 67 which represent the leakage adding positions of the 1st, 2nd, 3rd, 4th E1 tributary signals, and the leak_slot_num corresponds to 1, 2, 3, 4.

The leakage controller gives a leakage operation signal: it is to generate a leakage adding signal (add) and a leakage decreasing signal (dec) according to a cache depth depth_a of a storage space corresponding to a time slot number in the upstream cache RAM_A, wherein, the leakage adding signal (add) represents adding leakage once; the leakage decreasing signal (dec) represents decreasing leakage once;

the reading and writing controller generates a reading indication signal of the upstream RAM_A according to a current leakage time slot number signal (leak_slot_num), leakage operation signals (a leakage adding signal (add), a leakage decreasing signal (dec)), leakage position signals (a normal leakage position signal (norm_pos), a leakage adding position signal (add_pos), a leakage decreasing position signal (dec_pos)), reads out content of the data of the corresponding time slot from the cache, meanwhile writes the data read out into the storage space corresponding to a time slot number in the downstream RAM_B. The normal leakage generates a reading indication signal; if there is the leakage decreasing, a reading indication signal for the normal leakage is deducted; if there is the leakage adding, a reading indication signal is added at the leakage adding position.

The bit leakage circuit generates a reading indication signal of each tributary signal (corresponding to each time slot), reads out data from the upstream cache, and stores the data into the downstream data recovery cache RAM_B, and relatively uniformly leaks each tributary signal to the downstream cache RAM_B by controlling reading operation times, and recovers the data and clock information of each tributary signal in the downstream.

As an alternative way, and as shown in FIG. 10, the clock recovery circuit comprises: a deviation value calculation unit, a time slot generator, a readout signal generator, a counter and an accumulation value storage unit allocated for a time slot of each tributary, wherein:

the time slot generator continuously generates a time slot number signal(slot_num) circularly according to the frame head signal (fp) and the clock signal (clock). For the E1 signal, the slot_num continuously cycles from 1 to 63, which represents the time slot numbers of 63 E1 tributary signals required to be recovered.

The deviation value calculation unit obtains a data cache depth depth_b of the cache corresponding to a current time slot number from the downstream cache RAM_B and a counter result of a counter corresponding to the current time slot number according to a current time slot number signal (slot_num), performs an operation to obtain a cache depth deviation value of the time slot of the tributary;

For example, the current time slot number slot_num is 1, the data cache depth (depth_b) of the time slot of the first tributary is obtained from the cache RAM_B, and the current count result (counter) of the counter 1 of the time slot of the first tributary is obtained at the same time, the deviation value calculation unit calculates the cache deviation value (deviation) of the time slot of the first tributary according to the cache depth (depth_b) of the time slot 1 and the count result of the counter.

Wherein, the process for calculating the cache depth deviation value is as follows:

the deviation value calculation unit performs subtraction on the data cache depth (depth_b) value and a depth reference value to obtain a cache depth deviation situation, and the difference is an integer part of a depth deviation calculation value (depth_dev); the count result (counter) of the counter is a decimal part of the depth deviation calculation value (depth_dev). Wherein, the counter result (counter) of the counter is a counter result after the counter is cleared to zero last time until the counter is read currently.

It is to concatenate the integer part and decimal part of the data cache depth deviation calculation value (depth_dev) (the integer part is in the front, and the decimal part is behind the integer part) to be added with a reference clock standard value to obtain the cache depth deviation value(deviation).

The deviation value calculation unit obtains an accumulation value of last time from the accumulation storing unit corresponding to the current time slot number according to the current time slot number signal (slot_num), accumulates the cache depth deviation value (deviation) of the time slot of the tributary with the accumulation value (accumulation) of last time, and obtains an accumulation result (total) of the time slot of the tributary;

it is to judge whether the accumulation of this time is overflowed according to the accumulation result (total), when the adding operation is performed, if the accumulation is overflowed, it is to store an overflow flag at a flag position (p) of the counter corresponding to the current time slot number, meanwhile store a remainder of the accumulation result of this time into the accumulation value storage unit corresponding to the current time slot number as an accumulation value (accumulation) for a next operation.

The deviation value calculation unit completes all above calculation process within one clock period. For example, for the time slot of the first tributary, when the slot_num is 1, the overflow flag operation process of the time slot of the first tributary is completed. At the next clock period, when the slot_num is 2, the operation process of the time slot of the second tributary is completed, and so on, it is to continuously cycle to complete the accumulation operation processes of all time slots.

The time slot of each tributary has a counter, each counter comprises two parts: an overflow flag (p) and a counter n (n represents a time slot number), for the E1 signal, there are 63 counters. The overflow flag indicates whether an overflow phenomenon occurs in the adder when the accumulation operation is performed for the time slot last time. The counter n starts to count from zero continuously, if the overflow flag (p) of the counter is invalid, i.e., no overflow occurs, the counter is cleared to zero when the count of the counter reaches the target value (when the system clock is 155.52M, for the E1 signal, the target value is 74)+1, i.e., when the counter accumulates to 75, it is cleared to zero and restarts to count from zero; the overflow flag (p) of the counter is valid, the counter is cleared to zero only when the count of this time reaches the target value, and then the counter restarts to count from zero, when the counter is cleared to zero, the overflow flag (p) is required to be cleared at the same time. The counter of the time slot of each tributary counts independently, every time the counter is cleared to zero, it represents that the counter has completed one count period, and the counter outputs a clock pulse, the pulse is a recovery clock pulse of the time slot.

The readout signal generator is configured to, when the time slot number signal (slot_num) is generated, generate a readout signal (read_b) for a time slot of each tributary at the same time and judge whether the readout signal (read_b) is valid; that a readout signal of a time slot of any tributary is valid means that: if a current time slot number signal (slot_num) is within a next cycle period, the counter corresponding to a time slot number will generate a recovery clock pulse, and the readout signal is valid;

When the clock recovery circuit recovers the clock of each E1 tributary signal, the clock recovery circuit gives out a readout signal (read_b) and a time slot number (slot_num) of data of the time slot of each tributary at the same time, and prepares the data of the time slot of each tributary. For example, when the clock of the time slot of the first tributary is recovered, i.e., when the slot_num is 1, it is required to judge whether the readout signal (read_b) of the data recovery cache RAM_B is valid according to the count result of the counter 1, when the readout signal (read_b) is valid, it is to read out the data of the time slot of the first tributary, prepare the recovery data of the time slot of the first tributary. The principle that a readout signal read_b of a time slot of each tributary is valid comprises that: if the current time slot number signal (slot_num) is within a next cycle period, the counter corresponding to the time slot number will generate a recovery clock pulse, and the readout signal is valid. Taking the E1 signal as an example, when the system needs to recover the time slots of 63 tributaries, each cycle of the slot_num needs 63 clock periods, for the time slot of the first tributary, when the slot_num is from 1 to 1 again for next time, 63 clock periods are required. When the difference between the current value of the counter and the target value of the counter is greater than 63, it means that the counter will not count to the target value during the time after the slot_num cycles from 1 for one cycle until the slot_num equals to 1 again, that is, the recovery clock pulse of the current time slot cannot be generated, under that condition, it is not required to prepare the recovery data, therefore the readout signal read_b is invalid under that condition. When the difference between the current value of the counter and the target value of the counter is less than 63, it means that the counter will count to the target value during the time after the slot_num cycles from 1 for one cycle until the slot_num equals to 1 again, thereby the recovery clock pulse of the current time slot is generated, under that condition, it is required to prepare the recovery data, the readout signal read_b is valid, the data recovery module reads out the data from the downstream cache RAM_B in advance, and latches the data into the latch corresponding to the time slot number, for sampling by the recovery clock pulse.

The data recovery module reads out the recovery data of the storage space corresponding to the time slot number from the RAM_B according to the time slot number (slot_num) and the readout signal (read_b) is valid, and latches the recovery data into the latch corresponding to the time slot, for sampling by the recovery clock pulse.

Thus, all the clock and data of the E1 signal of the current tributary (the current time slot of the tributary) are recovered. The recovery processes of other time slots are also quite similar.

Figure 13:
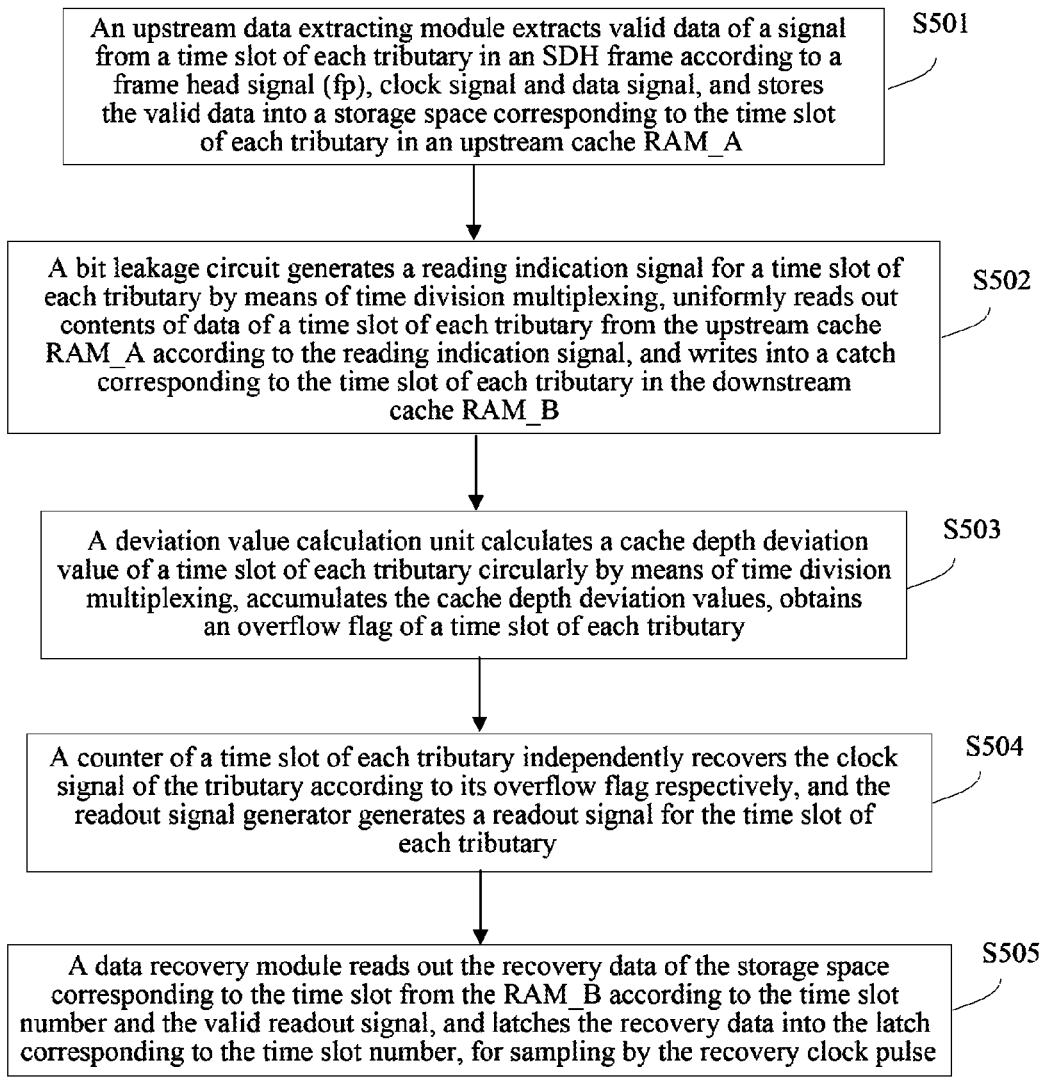
FIG. 13 is a flowchart of a method for recovering clock data of the tributary signal in SDH according to an application example.

As shown in FIG. 13, the device in the above application example is adopted and a method for recovering clock data of a tributary signal in SDH is further provided, comprising the following steps:

in step S501, the upstream data extracting module extracts the valid data of the signal from the time slot of each tributary in the SDH frame according to the frame head signal (fp), clock signal (clock) and data signal (data), and stores the valid data into the storage space corresponding to the time slot of each tributary in the upstream cache RAM_A;

the upstream data extracting circuit judges whether S1 bit and S2 bit are valid data according to the contents of C1 bit and C2 bit. If the positions of S1 bit, S2 bit are valid data, they are required to be extracted out and stored in the cache of the time slot. The cache RAM_A is divided according to the number of time slots of E1 in the SDH, there are 63 E1 signals in STM-1, the RAM_A is divided into 63 independent parts, the data of each E1 time slot are saved in corresponding storage spaces in the RAM respectively.

In step 502, a bit leakage circuit generates a reading indication signal for a time slot of each tributary by means of time division multiplexing, uniformly reads out contents of data of a time slot of each tributary from the upstream cache RAM_A according to the reading indication signal, and writes into a storage space corresponding to the time slot of each tributary in the downstream cache RAM_B;

Specifically, the following steps are included:

in step S5021, the clock counter takes the frame head signal (fp) as a reference to count the clocks, and generates various kinds of count values required by the time slot allocator;

Wherein, the clock counter (counter_low) counts from 1 to 75/76; the counters (counter_middle and counter_high) are used to count the time segments, both count from 1 to 16, when the counter_middle counts for one cycle, the counter_high just counts once, the counter_middle decides whether the maximum count value of the counter_low is 75 or 76. In FIG. 8 and FIG. 9, when the counter_middle is 1, the maximum count value of the counter_low is 75, the counter counter_low counts to 76 under other conditions. The counter_high decides whether the leakage adding or the leakage decreasing exists. In the application example, only when the counter_high is 1, there is possible leakage adding or leakage decreasing in the time segment, when the counter_high is another value, there is only normal leakage, and there is no leakage adding or leakage decreasing.

In step 5022, the time slot allocator generates a leakage time slot number signal (leak_slot_num), a normal leakage time position signal (norm_pos), a leakage adding time position signal (add_pos) and a leakage decreasing time position signal (dec_pos) used for time division multiplexing of the bit leakage circuit according to the count value of the above clock counter, wherein, the leak_slot_num ranging from 1 to 63 is valid;

in step 5023, the leakage controller generates a reading operation adding signal (add) and a reading operation decreasing signal (dec) according to the current leakage time slot number signal (leak_slot_num), a cache depth (depth_a) of the storage space corresponding to the current time slot number in the upstream cache RAM_A, and the current leakage position signals (norm_pos, add_posk, dec_pos);

in step 5024, according to the current leakage time slot number signal (leak_slot_num), leakage position signals (norm_pos, add_pos, dec_pos), the leakage adding signal (add) and leakage decreasing signal (dec), the reading and writing controller generates a reading indication signal (read_a) of the upstream cache RAM_A, reads out content of the data corresponding to a time slot of each tributary from the cache, and meanwhile writes the data read out into the storage space corresponding to the time slot in the downstream RAM_B.

In step 503, the deviation value calculation unit calculates a cache depth deviation value of a time slot of each tributary circularly by means of time-division multiplexing, accumulates the cache depth deviation values, obtains an overflow flag of a time slot of each tributary;

Specifically, the following steps are included:

in step S5031, the time slot generator continuously generates a time slot number signal(slot_num) circularly according to the frame head signal (fp) and the clock signal (clock);

For the E1 signal, the slot_num continuously cycles from 1 to 63, which represents the time slot numbers of 63 E1 tributary signals required to be recovered.

In step 5032, the deviation value calculation unit obtains a data cache depth (depth_b) of a storage space corresponding to a current time slot number from the downstream cache RAM_B and a counter result (counter) of a counter corresponding to the current time slot number according to a current time slot number signal (slot_num), performs an operation to obtain a cache depth deviation value (deviation) of the time slot of the tributary;

For example, when the current time slot number (slot_num) is 1, it is to obtain the data cache depth (depth_b) of the time slot of the first tributary, the deviation calculation unit performs subtraction on the data cache depth (depth_b) and a depth reference value, the difference therebetween is an integer part of a data cache depth deviation calculation value (depth_dev). At the same time, it is to take the current count result (counter) of the counter 1 of the time slot of the first tributary as a decimal part of the depth deviation calculation value (depth_dev). The deviation value calculation unit calculates the cache deviation value (deviation) of the time slot of first tributary according to the depth deviation calculation value of the time slot 1 and a reference clock standard value. The calculation process is as follows: the standard clock of the E1 signal is 2.048M, under the condition that the system clock is 155.52M, frequency division ie performed on the system clock 155.52M in the following way: in each 1024 time frequency divisions, 76-frequency division is for 960 times, 75-frequency division is for 64 times, by this way, the frequency division is continually performed circularly, an average frequency of the clock signals after the frequency division is 2.048M, which is a standard clock of the E1 signal. A binary reference clock standard value (base) is set as base=17'b0_0010_0000_0000_0000, the accumulation overflow threshold of the accumulator is set as 17'b1_1111_1111_1111_1111. The accumulation is continuously performed on the reference clock standard value, when the accumulation value exceeds the overflow threshold, it is overflowed, and the remainder continues to be accumulated with a reference clock reference label value. The overflow of the reference clock standard value will occur 64 times in every 1024 accumulations. If a current sampled data cache depth (depth) is 7-bit data (binary), the middle position of the data cache depth is 7'b100_0000, and the middle position is taken as a depth reference value. If a current sampled cache depth value (depth) is 7'b000_0000, it represents that the cache will be empty; if a current sampled cache depth (depth) is 7'b111_1111, it represents that the cache will be full. Therefore, the difference between the current sampled cache depth value (depth) and the middle position (depth reference value) is a cache depth deviation state, and the difference is taken as an integer part of the depth deviation calculation value (depth_dev). The count result (counter) of the counter is taken as a decimal part of the depth deviation calculation value (depth_dev). It is to concatenate the integer part of the depth deviation calculation value (depth_dev) and the decimal part of the depth deviation calculation value (depth_dev) (the integer part is in the front, and the decimal part is behind the integer part) to obtain the depth deviation calculation value (depth_dev), and the cache depth deviation value (deviation) is obtained by adding the depth deviation calculation value (depth_dev) with the reference clock standard value (base). When the depth deviation calculation value (depth_dev) is 0, it represents that there is no deviation in the cache depth, only the reference clock standard value (base) is left. The result for accumulating the reference clock standard values continuously is that, in every 1024 accumulations, the overflow will occur 64 times, no overflow will occur 960 times, the ratio of the overflow times and the no-overflow times is just the times required by the frequency division control. If the depth deviation calculation (depth_dev) is not equal to zero, the cache depth deviation value (deviation) is not equal to the reference clock standard value, which means that there is a deviation between the clock frequency and the standard frequency, and the deviation size of the depth deviation calculation value (depth_dev) reflects the deviation size of the clock frequency. If the depth deviation calculation value (depth_dev) is slightly larger, the cache depth deviation value (deviation) is greater than the reference clock standard value, the accumulation overflow times will be increased, the frequency recovery result will be sped up, and vice versa.

In S5033, the deviation value calculation unit obtains an accumulation value (accumulation) of last time from a storage space corresponding to a current time slot number of the accumulation value storage unit according to the current time slot number signal (slot_num), accumulates the cache depth deviation value (deviation) of the time slot of the tributary with the accumulation value of last time (accumulation), obtains an accumulation result (total) of the time slot of the tributary;

in step S5034, the deviation calculation unit judges whether accumulation of this time is overflowed according to the accumulation result (total), if the accumulation is overflowed, marks an overflow flag on a counter corresponding to the current time slot number, meanwhile stores a remainder of the accumulation result of this time into a storage space corresponding to a current time slot number of the accumulation value storage unit as an accumulation value (accumulation) for a next operation.

All the above-mentioned calculation processes are completed in one clock period.

In S504, the counter of the time slot of each tributary independently recovers the clock signals of the tributary according to its overflow flag, and the readout signal generator generates a readout signal (read_b) for the time slot of each tributary;

Wherein, the counter of the time slot of each tributary independently recovering the clock signals of the tributary according to its overflow flag respectively, comprises that:

in step 5041, the counter of the time slot of each tributary respectively takes a frame head signal as a reference, and performs the plus-1-counting from zero according to the clock signal;

in step 5042, when the overflow flag p of the counter is valid, it is to clear the counter to zero when a count of the counter reaches the standard value 74, for the E1 signal, the standard value is 74; when the overflow flag (p) of the counter is invalid, it is to clear the counter to zero only when the count of the counter reaches the standard value 74+1, i.e., 75, then the counter restarts to count from zero, when the counter is cleared to zero, it is to clear the overflow flag at the same time;

in S5043, when the counter is cleared to zero, it is to generate a recovery clock pulse.

The counter of the time slot of each tributary counts independently, every time the counter is cleared to zero, it represents that the counter has completed one count period, and the counter outputs a clock pulse, the pulse is a recovery clock pulse of the current time slot.

Wherein, when the time slot number signal (slot_num) is generated, the readout signal generator generates a readout signal (read_b) for a time slot of each tributary at the same time and judges whether the readout signal (read_b) is valid; that a readout signal of a time slot of any tributary is valid means that: if a current time slot number signal(slot_num) is within a next cycle period, the counter corresponding to a time slot number will generate a recovery clock pulse, and the readout signal is valid;

in step 505, the data recovery module reads out the recovery data of the storage space corresponding to the time slot from the RAM_B according to the time slot number (slot_num) and the valid readout signal (read_b), and latches the recovery data into the latch corresponding to the time slot number, for sampling by the recovery clock pulse.

The method and device in the above application example which take the E1 signal as an example are also applied to the T1 signal. For the T1 signal, there are 84 tributary signals in each STM-1, the nominal frequency of each T1 tributary signal is 1.5M. FIG. 4 and FIG. 5 are modified according to the T1 frame structure, and then they will be applied to the T1. For an STM-1 serial data stream, the clock signal of the data is 155.52M, the time length of one frame is 125 us, there are 19440 clock periods in the time length of one frame. For the T1 signal of one tributary, there are 193 bits in one STM-1 period (under a normal situation, when there is only one S1 to bear data, it is 193 bits; when there are 2 S1s to bear data, it is 194 bits, when two S1s don't bear data, it is 192 bits). Thus, 19440 clock periods can be divided into 53 time segments of 100 clock periods, and 140 time segments of 101 clock periods, and there are total 193 time segments, as shown in FIG. 7. In the first 53 time segments (time segments 1-53), there are 100 clock periods in each time segment, in the last 140 time segments, there are 101 clock periods in each time segment. In each time segment, it is to set 84 normal adjustment positions (the normal adjustment position has an adjustment decreasing function at the same time), set an adjustment adding position (there are only time slots of 84 tributaries, if only one adjustment adding position is set in one time segment, only 84 time segments are required to be set in 193 time segments, in the example, there is one adjustment adding position set in each time segment of the first 84 time segments), other positions are set as free adjustment positions.

The above contents are just the application examples of the embodiment of the present document, other ways, such as the way of recovering the time slot capacity, other ways of dividing the time segments, other ways of numbering the time slot number, are not excluded in the specific implementations.

From the above embodiments, it can be seen that, compared with the related art, the method and device for recovering clock data of a tributary signal in a synchronous digital hierarchy (SDH) provided by the above embodiment adopts one clock recovery circuit for multiple E1 or T1 tributary signals, and can recover recovery clocks and data for a plurality of tributary signals of which the clock frequencies are different simultaneously by means of time division multiplexing, and the circuit resources are greatly saved.

The ordinary skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Accordingly, each module/unit in the above embodiments can be implemented in a form of hardware, or can also be implemented in a form of software functional module. The present document is not limited to any particular form of a combination of hardware and software.

The above description is only preferred embodiments of the present document, and is not intended to limit the protection scope of the present document. According to the content of the present document, it may also have a variety of other embodiments, and without departing from the spirit and essence of the present document, a person skilled in the art can make a variety of corresponding changes and modifications in accordance with the present document, and any changes, equivalent replacements, and improvements made within the spirit and principles of the present document should be included within the protection scope of the present document.

INDUSTRIAL APPLICABILITY

The method and device for recovering clock data for a tributary signal in synchronous digital hierarchy (SDH) provided by the embodiment of the present document adopt one clock recovery circuit for multiple E1 or T1 tributary signals, and can recover recovery clocks and data of a plurality of tributary signals simultaneously by means of time division multiplexing, and the circuit resources are greatly saved.

What is claimed is:

1. A method for recovering clock data of a tributary signal in synchronous digital hierarchy (SDH), comprising:
   extracting valid data of a signal from a time slot of each tributary in a synchronous digital hierarchy (SDH) frame structure, and storing into a storage space corresponding to a time slot of each tributary in caches;
   recovering a clock signal and a readout signal for a time slot of each tributary by means of time division multiplexing; and
   when a readout signal for a time slot of any tributary is valid, reading out contents of data from the storage space corresponding to the time slot of the tributary in the caches, and latching into a latch corresponding to the time slot.

2. The method of claim 1, wherein,
   the caches comprise an upstream cache and a downstream cache;
   said extracting valid data of a signal from a time slot of each tributary in a synchronous digital hierarchy (SDH) frame structure, and storing into a storage space corresponding to a time slot of each tributary in caches comprises:
   extracting valid data of a signal from a time slot of each tributary in the SDH frame structure, and firstly storing the valid data into a storage space corresponding to a time slot of each tributary in the upstream cache; and
   generating a reading indication signal for a time slot of each tributary by means of time division multiplexing, uniformly reading out contents of data of a time slot of each tributary from the upstream cache according to the reading indication signal, and writing into a storage space corresponding to a time slot of each tributary in the downstream cache.

3. The method of claim 2, wherein,
   said generating a reading indication signal for a time slot of each tributary by means of time division multiplexing, uniformly reading out contents of data of a time slot of each tributary from the upstream cache according to the reading indication signal, comprises:
   dividing a clock period included in one SDH frame into M time segments, wherein, M is a positive integer, a number of bits of a time slot of each tributary is M−1, M or M+1; generating a reading indication signal for a time slot of each tributary at each time segment by means of time division multiplexing; every time a reading signal is generated, reading out one-bit data of a corresponding time slot;
   for a time slot of each tributary of which the number of bits is M, generating a reading indication signal for normal leakage once at each time segment of M time segments, reading out one-bit data;
   for a time slot of each tributary of which the number of bits is M−1, generating a reading indication signal for normal leakage once at each time segment of M−1 time segments, reading out one-bit data; and
   for a time slot of each tributary of which the number of bits is M+1, generating a reading indication signal for normal leakage once at each time segment of M time segments; generating a reading indication signal for leakage adding once at one of the time segments; and pre-dividing time segments at which a reading indication signal for leakage adding can be generated for a time slot of each tributary in the SDH frame; ensuring that a number of clock periods included in each time segment is always not less than a maximum number of reading indication signals which are probably generated.

4. The method of claim 2, wherein,
   said recovering a clock signal for a time slot of each tributary by means of time division multiplexing, comprises:
   calculating a cache depth deviation value of a time slot of each tributary circularly by means of time division multiplexing, and accumulating the cache depth deviation values, obtaining an overflow flag of a time slot of each tributary; and a time slot of each tributary recovering the clock signal for the time slot of the tributary independently according to the overflow flag of a time slot of each tributary respectively.

5. The method of claim 4, wherein,
said calculating a cache depth deviation value of a time slot of each tributary circularly by means of time division multiplexing, and accumulating the cache depth deviation values, obtaining an overflow flag of a time slot of each tributary, comprises:
generating a time slot number signal (slot_num) according to a frame head signal and a clock signal, wherein the time slot number signal (slot_num) continuously cycles from 1 to n, n is a positive integer which is determined by a number of time slots in the SDH frame structure; and
calculating a cache depth deviation value of a time slot of a current tributary according to a current time slot number signal (slot_num), accumulating the cache depth deviation values, if an accumulation is overflowed, generating an overflow flag of the time slot of the current tributary.

6. The method of claim 5, wherein,
a time slot of each tributary recovering the clock signal for the time slot of the tributary independently according to the overflow flag of a time slot of each tributary respectively, comprises:
setting a counter for a time slot of each tributary, when the counter is cleared to zero, generating a clock pulse; and
when an overflow flag of the counter is valid, clearing the counter to zero when a count of the counter reaches a standard value, when an overflow flag of the counter is invalid, clearing the counter to zero when the count of the counter reaches the standard value+1, then the counter restarting to count from zero, wherein, the standard value is determined by a frequency of the clock signal and a nominal frequency of each tributary signal in the SDH frame structure.

7. The method of claim 6, wherein,
said recovering a readout signal for a time slot of each tributary by means of time division multiplexing, comprises:
when the time slot number signal (slot_num) is generated, generating a readout signal for a time slot of each tributary at the same time; and
wherein, said a readout signal for a time slot of any tributary being valid comprises that: if a current time slot number signal (slot_num) is within a next cycle period, a counter of a time slot of a current tributary will generate a clock pulse, the readout signal is valid.

8. A device for recovering clock data of a tributary signal in synchronous digital hierarchy (SDH), comprising:
a data extracting module, configured to extract valid data of a signal from a time slot of each tributary in a synchronous digital hierarchy (SDH) frame structure, and store into a storage space corresponding to a time slot of each tributary in caches;
a clock recovery circuit module, configured to recover a clock signal and a readout signal for a time slot of each tributary by means of time division multiplexing, and send the clock signal and the readout signal to a data recovery module; and
the data recovery module, configured to receive the clock signal and the readout signal, and when a readout signal for a time slot of any tributary is valid, read out contents of data from the storage space corresponding to the time slot of the tributary in the caches, and latch into a latch corresponding to the time slot.

9. The device of claim 8, wherein,
the caches comprise an upstream cache and a downstream cache;
the data extracting module comprises:
an upstream data extracting circuit, configured to extract valid data of a signal from a time slot of each tributary in the SDH frame structure, and firstly store the valid data into a storage space corresponding to a time slot of each tributary in the upstream cache; and
a bit leakage circuit, configured to generate a reading indication signal for a time slot of each tributary by means of time division multiplexing, uniformly read out contents of data of a time slot of each tributary from the upstream cache according to the reading indication signal, and write the contents of the data into a storage space corresponding to a time slot of each tributary in the downstream cache.

10. The device of claim 9, wherein,
the bit leakage circuit generates a reading indication signal for a time slot of each tributary by means of time division multiplexing, uniformly reads out contents of data of a time slot of each tributary from the upstream cache according to the reading indication signal in the following way:
dividing a clock period included in one SDH frame into M time segments, wherein, M is a positive integer, a number of bits of a time slot of each tributary is M−1, M or M+1; generating a reading indication signal for a time slot of each tributary at each time segment by means of time division multiplexing; every time a reading signal is generated, reading out one-bit data of a corresponding time slot;
for a time slot of each tributary of which the number of bits is M, generating a reading indication signal for normal leakage once at each time segment of M time segments, reading out one-bit data;
for a time slot of each tributary of which the number of bits is M−1, generating a reading indication signal for normal leakage once at each time segment of M−1 time segments, reading out one-bit data; and
for a time slot of each tributary of which the number of bits is M+1, generating a reading indication signal for normal leakage once at each time segment of M time segments; generating a reading indication signal for leakage adding once at one of the time segments; and pre-dividing time segments at which a reading indication signal for leakage adding can be generated for a time slot of each tributary in the SDH frame; ensuring that a number of clock periods included in each time segment is always not less than a maximum number of reading indication signals which are probably generated.

11. The device of claim 10, wherein,
the bit leakage circuit further comprises:
one or more clock counters, wherein the counter is configured to take a frame head signal as a reference to count;
a time slot allocator, configured to determine leakage positions for normal leakage, leakage adding or leakage decreasing in each time segment and a current leakage time slot number according to an output result of the clock counter; and
a reading and writing controller, configured to, according to leakage positions for normal leakage, leakage adding or leakage decreasing in each segment and a current leakage time slot number, at each segment, normally leak data once or add data leakage once or decrease data leakage once from the storage space corresponding to a time slot number in the upstream cache to the storage space corresponding to a time slot number in the downstream cache according to the current leakage time slot number, wherein, a reading indication signal is generated upon the normal leakage, a reading indication signal for the normal leakage is deducted upon decreasing the leakage; a reading indication signal is added at the leakage position for the leakage adding upon adding the leakage.

12. The device of claim 11, wherein,
the bit leakage circuit further comprises:
a leakage controller, configured to generate a leakage adding signal and a leakage decreasing signal according to a cache depth of a storage space in the upstream cache corresponding to a time slot number, wherein, the leakage adding signal represents adding leakage once; the leakage decreasing signal represents decreasing leakage once; and
a reading and writing controller, configured to, according to leakage positions for normal leakage, leakage adding or leakage decreasing in each segment and a current leakage time slot number, a leakage adding signal, a leakage decreasing signal, at each segment, add data leakage once according to the leakage adding signal or decrease data leakage once according to the leakage decreasing signal from the storage space corresponding to the time slot number in the upstream cache to the storage space corresponding to the time slot number in the downstream cache according to the current leakage time slot number, wherein, a reading indication signal for the normal leakage is deducted upon decreasing the leakage; a reading indication signal is added at the leakage position for the leakage adding upon adding the leakage.

13. The device of claim 9, wherein,
the clock recovery circuit comprises: a deviation value calculation unit and a counter set for a time slot of each tributary, wherein, the counter comprises an overflow flag;
the deviation value calculation unit is configured to calculate a cache depth deviation value of a time slot of each tributary circularly by means of time division multiplexing, accumulate the cache depth deviation values, obtain an overflow flag of a time slot of each tributary; and
the counter of the time slot of each tributary is configured to recover a clock signal for the time slot of the tributary according to the overflow flag.

14. The device of claim 13, wherein,
the clock recovery circuit further comprises:
an accumulation value storage unit, configured to store an accumulation value of last time output by the deviation value calculation unit of a time slot of each tributary into a storage space corresponding to a time slot of each tributary;
a time slot generator, configured to generate a time slot number signal (slot_num) according to a frame head signal and a clock signal, wherein the time slot number signal (slot_num) continuously cycles from 1 to n, n is a positive integer which is determined by a number of time slots in the SDH frame structure;
wherein, the deviation value calculation unit calculates a cache depth deviation value of a time slot of each tributary circularly by means of time division multiplexing, accumulates the cache depth deviation values, obtains an overflow flag of a time slot of each tributary in the following way:
the deviation value calculation unit obtaining a data cache depth of a storage space corresponding to a current time slot number and a count result of a counter corresponding to the current time slot number from the downstream cache according to a current time slot number signal (slot_num), performing an operation to obtain a cache depth deviation value of the time slot of the tributary;
obtaining an accumulation value of last time from a storage space corresponding to a current time slot number of the accumulation value storage unit according to a current time slot number signal (slot_num), accumulating the cache depth deviation value of the time slot of the tributary with the accumulation value of last time, obtaining an accumulation result of the time slot of the tributary; and
judging whether an accumulation of this time is overflowed according to the accumulation result, if the accumulation is overflowed, marking an overflow flag on a counter corresponding to a current time slot number, meanwhile storing a remainder of the accumulation result of this time into a storage space corresponding to a current time slot number of the accumulation value storage unit as an accumulation value for a next operation.

15. The device of claim 14, wherein,
the clock recovery circuit further comprises:
a readout signal generator, configured to, when the time slot number signal (slot_num) is generated, generate a readout signal for a time slot of each tributary at the same time;
wherein, the data recovery module further comprises a latch set for a time slot of each tributary, configured to save contents of data in the storage space corresponding to a time slot number read from the downstream cache; wherein, the latch is numbered according to a time slot number; and
when a readout signal for a time slot of any tributary is valid, the data recovery module reads out contents of data from the storage space corresponding to the time slot of the tributary in the caches, and latches into a latch corresponding to the time slot in the following way:
when a readout signal for the time slot of any tributary is valid, reading out contents of data in a storage space corresponding to the time slot number from the downstream cache according to a current time slot number signal(slot_num) and a readout signal, and latching into a latch corresponding to the time slot number; wherein, said a readout signal in a time slot of any tributary being valid comprises that: if a current time slot number signal(slot_num) is within a next cycle period, a counter of a time slot of a current tributary will generate a clock pulse, the readout signal is valid.

16. The device of claim 13, wherein,
a counter of a time slot of each tributary recovers the clock signal for the time slot of the tributary according to the overflow flag in the following way:
the counter of the time slot of each tributary respectively taking a frame head signal as a reference, and performing plus-1-counting from zero according to the clock signal;
when an overflow flag of the counter is valid, clearing the counter to zero when a count of the counter reaches a standard value, when an overflow flag of the counter is invalid, clearing the counter to zero when the count of the counter reaches the standard value+1, then the counter restarting to count from zero, when the counter is cleared to zero, clearing the overflow flag at the same time, wherein, the standard value is determined by a frequency of the clock signal and a nominal frequency of each tributary signal in the SDH frame structure; and when the counter is cleared to zero, generating a clock pulse.

* * * * *